US012559986B2

(12) United States Patent (10) Patent No.: US 12,559,986 B2
Kumar et al. (45) Date of Patent: Feb. 24, 2026

(54) ROTATION CONVERTER

(71) Applicant: Schlage Lock Company LLC, Carmel, IN (US)

(72) Inventors: Phaneendra Kumar, Bangalore (IN); Nagesh Varadaraju, Bangalore (IN); Aaron P. McKibben, Fishers, IN (US)

(73) Assignee: Schlage Lock Company LLC, Carmel, IN (US)

( * ) Notice: Subject to any disclaimer, the term of this patent is extended or adjusted under 35 U.S.C. 154(b) by 131 days.

(21) Appl. No.: 18/395,945

(22) Filed: Dec. 26, 2023

(65) Prior Publication Data

US 2024/0125151 A1 Apr. 18, 2024

Related U.S. Application Data

(63) Continuation of application No. 16/860,483, filed on Apr. 28, 2020, now Pat. No. 11,851,915.

(51) Int. Cl.
E05B 65/10 (2006.01)
E05B 15/00 (2006.01)
(Continued)

(52) U.S. Cl.
CPC ...... E05B 65/1053 (2013.01); E05B 15/0033 (2013.01); F16H 1/04 (2013.01);
(Continued)

(58) Field of Classification Search
CPC .............. E05B 65/1053; E05B 65/108; E05B 65/1033; E05B 65/1046; E05B 65/1006;
(Continued)

(56) References Cited

U.S. PATENT DOCUMENTS 4,183,563 A 1/1980 Stevens
4,333,324 A 6/1982 Dietrich et al.
(Continued)

FOREIGN PATENT DOCUMENTS

CN 109653602 A * 4/2019 ............. E05B 43/00
DE 202012003361 U1 * 4/2012 ............. E05B 53/00
(Continued)

OTHER PUBLICATIONS

AU Examination Report, IP Australia, Australian Patent Application No. 2021263376, Jan. 25, 2024, 4 pages.
(Continued)

*Primary Examiner* — Steven A Tullia
(74) *Attorney, Agent, or Firm* — Taft Stettinius & Hollister LLP

(57) ABSTRACT

An exemplary rotation converter includes an input component, an output component, and an intermediate component engaged between the input component and the output component. The input component is rotatable from an input component home position in each of a first direction and an opposite second direction. The intermediate component is configured to move to an actuated position in response to rotation of the input component in either direction, and to rotate the output component in an actuating direction as the intermediate component moves to the actuated position.

20 Claims, 13 Drawing Sheets

(51) Int. Cl.

| | |
|---|---|
| *E05B 47/06* | (2006.01) |
| *F16H 1/04* | (2006.01) |
| *F16H 19/04* | (2006.01) |
| *F16H 25/18* | (2006.01) |

(52) U.S. Cl.
CPC ............. *F16H 19/04* (2013.01); *F16H 25/18* (2013.01); *E05B 47/0676* (2013.01); *E05B 65/108* (2013.01)

(58) Field of Classification Search
CPC ............. E05B 65/1086; E05B 15/0033; E05B 47/0676; E05B 2047/0094; E05B 2047/002; E05B 63/042; E05B 63/0056; F16H 1/04; F16H 19/04; F16H 25/18; Y10T 292/57; Y10T 292/0908; Y10T 292/0909; Y10T 292/091; Y10T 292/308; Y10T 292/522; Y10T 292/1056; Y10T 292/68; Y10T 292/0946; Y10T 292/1079; Y10S 292/65
See application file for complete search history.

(56) References Cited

U.S. PATENT DOCUMENTS

| | | | | |
|---|---|---|---|---|
| 4,658,664 | A * | 4/1987 | Jacobs | E05C 1/16 |
| | | | | 292/172 |
| 4,811,617 | A * | 3/1989 | Whiteman, Jr. | F16H 19/04 |
| | | | | 192/48.91 |
| 4,934,800 | A * | 6/1990 | Choi | E05B 53/00 |
| | | | | 292/DIG. 60 |
| 5,020,343 | A | 6/1991 | Hart et al. | |
| 5,029,914 | A * | 7/1991 | Hankel | E05B 3/06 |
| | | | | 292/336.5 |
| 6,328,357 | B1 * | 12/2001 | Overbey | E05B 1/003 |
| | | | | 292/172 |
| 6,540,274 | B2 * | 4/2003 | Bates | E05C 1/163 |
| | | | | 292/336.5 |
| 6,695,365 | B2 * | 2/2004 | Chong | E05B 3/00 |
| | | | | 292/DIG. 53 |
| 6,802,546 | B2 * | 10/2004 | Bates | E05B 55/005 |
| | | | | 292/167 |
| 7,249,477 | B2 | 7/2007 | Toloday et al. | |
| 8,826,705 | B2 | 9/2014 | Tien | |
| 8,882,162 | B2 * | 11/2014 | Uyeda | E05B 59/00 |
| | | | | 70/91 |
| 9,222,286 | B2 | 12/2015 | Uyeda | |
| 10,711,870 | B1 * | 7/2020 | Cui | F16H 19/0659 |
| 2005/0257583 | A1 | 11/2005 | Lin | |
| 2006/0010942 | A1 * | 1/2006 | Toloday | E05B 63/0065 |
| | | | | 70/210 |
| 2006/0053846 | A1 | 3/2006 | Huang et al. | |
| 2007/0266807 | A1 | 11/2007 | Tondolo | |
| 2009/0308112 | A1 | 12/2009 | Uyeda | |
| 2009/0314043 | A1 | 12/2009 | Tien et al. | |
| 2010/0140961 | A1 | 6/2010 | Tien et al. | |
| 2010/0251788 | A1 | 10/2010 | Lin | |
| 2013/0154283 | A1 | 6/2013 | Arlinghaus et al. | |
| 2014/0021002 | A1 * | 1/2014 | Guo | E05B 63/04 |
| | | | | 192/71 |
| 2015/0115624 | A1 | 4/2015 | Frolov et al. | |
| 2015/0252592 | A1 | 9/2015 | Tien | |
| 2015/0292245 | A1 | 10/2015 | Miller et al. | |
| 2015/0376921 | A1 | 12/2015 | Corwin, Jr. | |
| 2017/0292293 | A1 | 10/2017 | Lin | |
| 2019/0078354 | A1 | 3/2019 | Quinn et al. | |
| 2019/0376313 | A1 | 12/2019 | Barker et al. | |
| 2021/0164267 | A1 | 6/2021 | Holtrewe et al. | |

FOREIGN PATENT DOCUMENTS

| | | | | |
|---|---|---|---|---|
| EP | 0662552 A2 * | 7/1995 | .............. | E05C 9/00 |
| EP | 0662555 A2 * | 7/1995 | ............ | E05C 9/047 |
| ES | 2323201 A1 | 7/2009 | | |
| FR | 3028547 A1 | 5/2016 | | |
| KR | 20160087699 A | 7/2016 | | |
| KR | 20180003099 A | 9/2018 | | |
| WO | 0028175 A2 | 5/2000 | | |
| WO | 2015114670 A1 | 8/2015 | | |
| WO | 2019033147 A1 | 2/2019 | | |
| WO | WO-2021046790 A1 * | 3/2021 | ........... | F16D 41/088 |

OTHER PUBLICATIONS

Extended European Search Report , European Patent Office, European Patent Application No. 21797000.3, May 27, 2024, 8 pages.
New Zealand Examination Report, New Zealand Intellectual Property Office, New Zealand Patent Application No. 794814, May 30, 2024, 4 pages.
Second New Zealand Examination Report, New Zealand Intellectual Property Office, New Zealand Patent Application No. 794814, Nov. 28, 2024, 4 pages.
New Zealand Patent Examination Report; New Zealand Intellectual Property Office; New Zealand Application No. 794814; Apr. 7, 2025; 4 pages.
New Zealand Patent Examination Report; New Zealand Intellectual Property Office; New Zealand Application No. 794814; May 19, 2025; 4 pages.
AU Examination Report, IP Australia, Australian Patent Application No. 2021263376, Feb. 22, 2024, 3 pages.
Canadian Examination Report; Canadian Intellectual Property Office; Canaidan Patent Application No. 3,177,309; Apr. 17, 2024, 6 pages.
Canadian Examination Report; Canadian Intellectual Property Office; Canadian Patent Application No. 3,177,309; Aug. 23, 2024; 3 pages.
New Zealand Patent Examination Report; New Zealand Intellectual Property Office; New Zealand Application No. 794814; Jan. 21, 2025; 5 pages.
New Zealand Patent Examination Report; New Zealand Intellectual Property Office; New Zealand Application No. 794814; May 27, 2025; 5 pages.

* cited by examiner

500

510

Install Exit Device Assembly to Door

Install Pushbar Assembly to Egress Side of Door ~512

Engage Output Member with Actuator ~514

Engage Input Member with Drive Spindle ~516

Install Trim Assembly to Non-Egress Side of Door ~518

520

Convert Rotation of Drive Spindle to Rotation of Actuator in Actuator Actuating Direction Convert Rotation of Drive Spindle in First Drive Spindle Direction to Rotation of Actuator in Actuator Actuating Direction ~522

Convert Rotation of Drive Spindle in Second Drive Spindle Direction to Rotation of Actuator in Actuator Actuating Direction ~524

530

Actuate Latch Mechanism in Response to Rotation of Actuator in Actuator Actuating Direction Shift Slide Plate in Slide Plate Actuating Direction in Response to Rotation of Actuator in Actuating Direction ~532

Actuate Latch Control Assembly in Response to Movement of Slide Plate in Slide Plate Actuating Direction ~534

Actuate Latch Mechanism in Response to Actuation of Latch Control Assembly ~536

540

Deactuate Exit Device Assembly

Return Input Member to Input Member Position in Response to Return of Drive Spindle ~541

Return Shuttle to Shuttle Home Position in Response to Return of Input Member ~542

Return Output Member to Output Member Home Position in Response to Return of Shuttle ~543

Return Actuator to Actuator Home Position in Response to Return of Output Member ~544

Deactuate Latch Control Assembly in Response to Return of Actuator ~545

Deactuate Latch Mechanism in Response to Deactuation of Latch Control Assembly ~546

FIG. 18

ROTATION CONVERTER

CROSS-REFERENCE TO RELATED APPLICATIONS

The present application is a continuation of U.S. patent application Ser. No. 16/860,483 filed Apr. 28, 2020 and issued as U.S. Pat. No. 11,851,915, the contents of which are incorporated herein by reference in their entirety.

TECHNICAL FIELD

The present disclosure generally relates to rotation converters, and more particularly but not exclusively relates to rotation converters for exit device assemblies.

BACKGROUND

Exit device assemblies typically include a pushbar assembly mounted to an egress side of a door and a trim assembly mounted to the non-egress side of the door. The trim assembly may include a handle that is operable to rotate a drive spindle in each of a first direction and a second direction. The drive spindle may be engaged with the pushbar assembly such that rotation of the spindle in the first direction actuates the latch control assembly of the pushbar assembly. In certain pushbar assemblies, however, the latch control assembly is not capable of being actuated by the drive spindle when the drive spindle attempts to rotate in the second direction. As such, the handle must be rotated in the first direction in order to actuate the latch control assembly. In certain circumstances, however, it may be desirable for the handle to actuate the latch control assembly when rotated in the second direction.

Certain existing trim assemblies include mechanisms that convert rotation of the handle in the second (non-actuating) direction to rotation of the drive spindle in the first (actuating) direction. However, these mechanisms are typically bulky and increase the size of the trim assembly, which may be undesirable. Moreover, if a building owner wishes to upgrade an existing exit device assembly to enable actuation of the latch control assembly by rotation of the handle in both directions, the owner must replace the entire trim assembly, which can be costly and time consuming. Moreover, the bulky rotation-converting trim assemblies often lack the aesthetic appeal of the sleeker traditional designs. For these reasons among others, there remains a need for further improvements in this technological field.

SUMMARY

An exemplary rotation converter includes an input component, an output component, and an intermediate component engaged between the input component and the output component. The input component is rotatable from an input component home position in each of a first direction and an opposite second direction. The intermediate component is configured to move to an actuated position in response to rotation of the input component in either direction, and to rotate the output component in an actuating direction as the intermediate component moves to the actuated position. Further embodiments, forms, features, and aspects of the present application shall become apparent from the description and figures provided herewith.

BRIEF DESCRIPTION OF THE FIGURES

FIG. 18 is a schematic flow diagram of a process according to certain embodiments.

DETAILED DESCRIPTION OF ILLUSTRATIVE EMBODIMENTS

Figure 2:
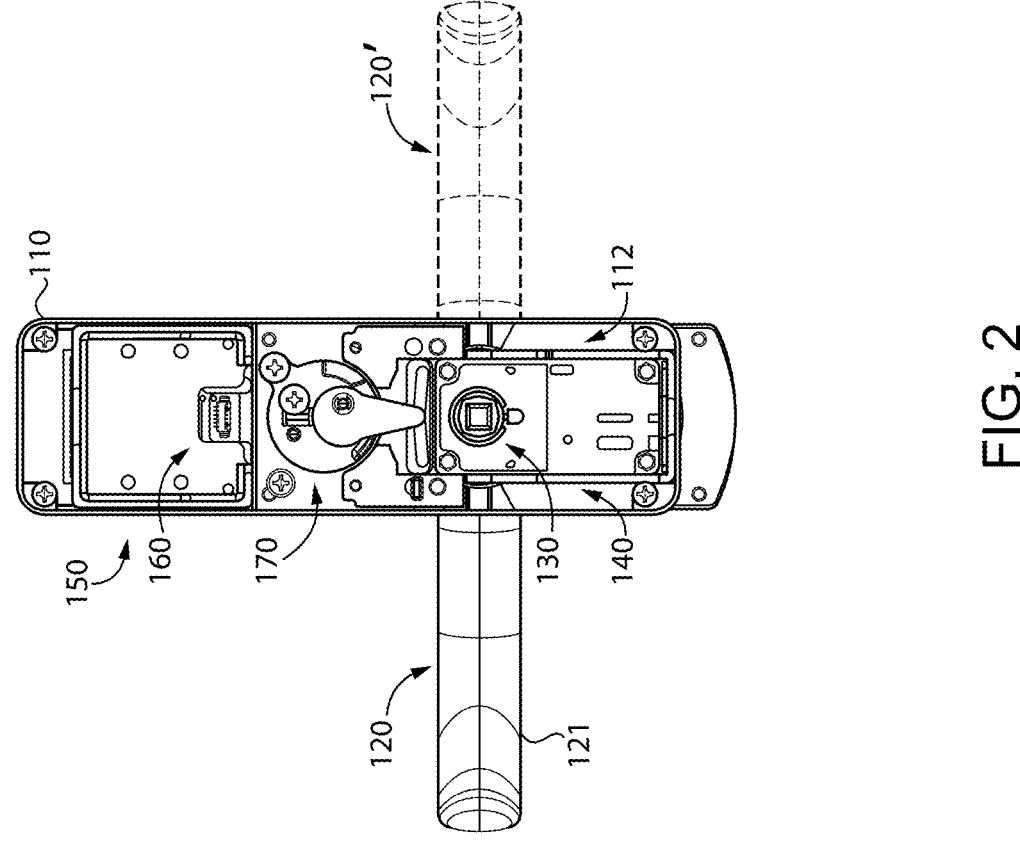
FIG. 2 is a rear plan view of a trim assembly that may be utilized in the exit device assembly illustrated in FIG. 1.

Although the concepts of the present disclosure are susceptible to various modifications and alternative forms, specific embodiments have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. It should further be appreciated that although reference to a "preferred" component or feature may indicate the desirability of a particular component or feature with respect to an embodiment, the disclosure is not so limiting with respect to other embodiments, which may omit such a component or feature. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the terms "longitudinal," "lateral," and "transverse" are used to denote motion or spacing along three mutually perpendicular axes, wherein each of the axes defines two opposite directions. In the coordinate system illustrated in FIG. 1, the X-axis (into and out of the page) defines first and second longitudinal directions, the Y-axis defines first and second lateral directions, and the Z-axis defines first and second transverse directions. These terms are used for ease and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements that are described as being "laterally offset" from one another may also be offset in the longitudinal and/or transverse directions, or may be aligned in the longitudinal and/or transverse directions. The terms are therefore not to be construed as limiting the scope of the subject matter described herein to any particular arrangement unless specified to the contrary.

Additionally, it should be appreciated that items included in a list in the form of "at least one of A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C). Items listed in the form of "A, B, and/or C" can also mean (A); (B); (C); (A and B); (B and C); (A and C); or (A, B, and C). Further, with respect to the claims, the use of words and phrases such as "a," "an," "at least one," and/or "at least one portion" should not be interpreted so as to be limiting to only one such element unless specifically stated to the contrary, and the use of phrases such as "at least a portion" and/or "a portion" should be interpreted as encompassing both embodiments including only a portion of such element and embodiments including the entirety of such element unless specifically stated to the contrary.

Furthermore, certain features described herein may be described as configured to perform a function in response to either of a first condition and a second condition. For example, a component may be described as being "configured to perform function X in response to either of condition A and condition B." As used herein, such language indicates that the component is configured to perform function X in response to condition A, and is further configured to perform function X in response to condition B.

In the drawings, some structural or method features may be shown in certain specific arrangements and/or orderings. However, it should be appreciated that such specific arrangements and/or orderings may not necessarily be required. Rather, in some embodiments, such features may be arranged in a different manner and/or order than shown in the illustrative figures unless indicated to the contrary. Additionally, the inclusion of a structural or method feature in a particular figure is not meant to imply that such feature is required in all embodiments and, in some embodiments, may be omitted or may be combined with other features.

The disclosed embodiments may, in some cases, be implemented in hardware, firmware, software, or a combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

Figure 1:
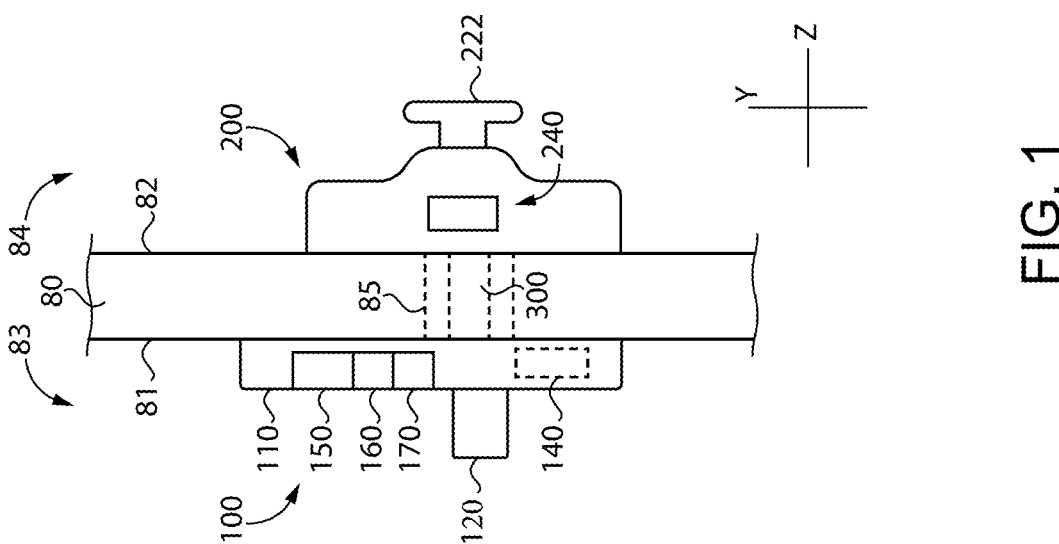
FIG. 1 is a schematic representation of an exit device assembly according to certain embodiments installed to a door.

With reference to FIG. 1, illustrated therein is a door 80 having installed thereon an exit device assembly 90 according to certain embodiments. The door 80 generally includes a non-egress side 81 and an egress side 82 opposite the non-egress side 81. When the door 80 is in its closed position, the non-egress side 81 faces an exterior or outer region 83, and the egress side 82 faces an interior or access-controlled region 84. Additionally, a door preparation 85 is formed in the door 80 and defines a pathway between the non-egress side 81 and the egress side 82. The exit device assembly 90 generally includes a trim 100 installed to the non-egress side 81, a pushbar assembly 200 installed to the egress side 82, and a rotation converter 300 seated in the door preparation 85 and operably connecting the trim 100 and the pushbar assembly 200. As described herein, the illustrated pushbar assembly 200 includes a latch mechanism 240 and a pushbar 222 operable to actuate the latch mechanism 240, and the trim 100 is at least selectively operable to actuate the latch mechanism 240 via the rotation converter 300.

With additional reference to FIG. 2, the trim 100 generally includes an escutcheon 110, a handle 120 rotatably mounted to the escutcheon 110, and a drive spindle 130 at least selectively connected with the handle 120. In certain embodiments, the trim assembly 100 may further include an electromechanical lock mechanism 140 operable to selectively connect the handle 120 with the drive spindle 130 and a control assembly 150 operable to control the electromechanical lock mechanism 140, and may further include a credential reader 160 in communication with the control assembly 150. In addition or as an alternative to the electromechanical lock mechanism 140, the trim 100 may include a mechanical lock mechanism 170 operable to selectively connect the handle 120 with the drive spindle The escutcheon 110 is mounted to the non-egress side 81 of the door 80, and defines a chamber 112 in which various components of the trim 100 are mounted. For example, the electromechanical lock mechanism 140 may be mounted in the chamber 112 along with the drive spindle 130, and the credential reader 160 may be mounted in the chamber 112 such that a front face of the credential reader 160 is accessible from outside the escutcheon 110.

Figure 3:
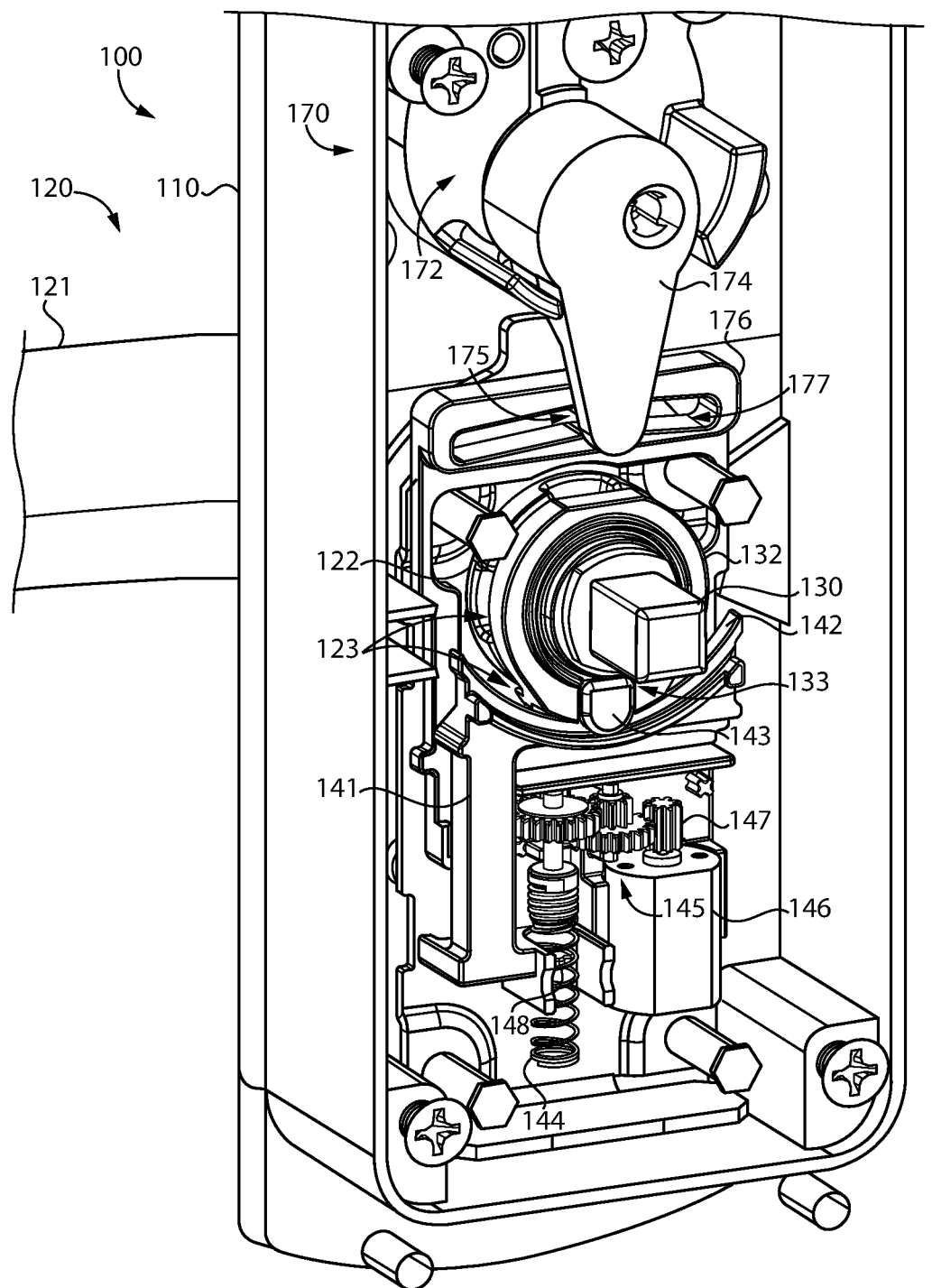
FIG. 3 is a perspective view of a portion of the trim assembly illustrated in FIG. 2.

With additional reference to FIG. 3, the handle 120 is rotatably mounted to the escutcheon 110, and is at least selectively operable to cause rotation of the drive spindle 130. In the illustrated form, the handle 120 is provided in the form of a lever handle that includes a shank and a grip portion 121 in the form of a lever that extends from the shank in a substantially horizontal direction. In other embodiments, the handle 120 may be provided in another form, such as that of a knob handle in which the grip portion is provided as a knob. As described herein, the handle 120 may be selectively coupled with the drive spindle 130 via the lock mechanism 140. It is also contemplated that the handle 120 may be at all times coupled with the drive spindle 130.

In the illustrated form, the handle 120 is rotationally coupled with an adapter 122 that includes a plurality of notches 123, which facilitate the coupling of the handle 120 with the drive spindle 130 as described herein.

In the illustrated embodiment, the handle 120 is mounted to the escutcheon 110 in a right-handed orientation, in which the grip portion or lever 121 extends from the shank primarily in a rightward direction when viewing the front of the trim assembly 100. In this right-handed orientation, pressing the lever 121 downward pivots the handle 120 in a first direction (counter-clockwise in FIG. 2), and pressing the lever 121 upward pivots the handle 120 in an opposite second direction (clockwise in FIG. 2). It is also contemplated that the handle 120 may be mounted to the escutcheon 110 in a left-handed orientation, in which the lever 121 extends from the shank primarily in a leftward direction when viewing the front of the trim assembly 100. In this left-handed orientation (illustrated in phantom in FIG. 2 as the left-handed orientation 120'), pressing the lever 121 downward pivots the handle 120 in the second direction (clockwise in FIG. 2), and pressing the lever 121 upward pivots the handle in the first direction (counter-clockwise in FIG. 2).

The illustrated drive spindle 130 is rotationally coupled with a collar 132 that includes a notch 133. Additionally, the drive spindle 130 is at least selectively engaged with the handle 120 such that the handle 120 is at least selectively operable to rotate the spindle 130. When the handle 120 is connected with the drive spindle 130, rotation of the handle 120 in either handle direction causes a corresponding rotation of the drive spindle 130 in a corresponding drive spindle direction. As described herein, rotation of the drive spindle 130 is operable to actuate the latch mechanism 240 via the rotation converter 300.

The electromechanical lock mechanism 140 includes a movable wall 141 having an arcuate surface 142 that supports a coupler 143, a coil spring 144 engaged with the movable wall 141, a gear train 145 operable to rotate the spring 144, and a motor 146 including a motor shaft 147 operable to rotate the gear train 145. The coupler 143 has a coupling position and a decoupling position, and is biased toward the decoupling position, for example by a spring. In the coupling position, the coupler 143 is partially received in one of the adapter notches 123, and is partially received in the collar notch 133 such that the coupler 143 extends between and rotationally couples the adapter 122 and the collar 132. As a result, the handle 120 is operably coupled with the drive spindle 130 and is operable to rotate the drive spindle 130 to actuate the latch mechanism 240; the trim 100 is thus in an unlocked state. In the decoupling position, the coupler 143 is removed from the notches 123, 133 such that the adapter 122 is rotationally decoupled from the collar 132. As a result, the handle 120 is inoperable to rotate the drive spindle, and therefore cannot actuate the latch mechanism 240; the trim 100 is thus in a locked state.

As set forth above, the coupling position of the coupler 143 corresponds to the unlocked state of the trim 100, and the decoupling position of the coupler 143 corresponds to the locked state of the trim 100. The arcuate support surface 142 of the movable wall 141 is engaged with the coupler 143 such that movement of the movable wall 141 between an upper position and a lower position drives the coupler 143 between its coupling and decoupling positions. More particularly, when the movable wall 141 is in its upper position, the support surface 142 retains the coupler 143 in its coupling position, thereby unlocking the trim assembly 100. As such, the upper position of the movable wall 141 corresponds to the coupling position of the coupler 143 and the unlocked state of the trim assembly 100, and may alternatively be referred to as the unlocking position. When the movable wall 141 is in its lower position, the coupler 143 moves to the decoupling position to which the coupler 143 is biased, thereby locking the trim assembly 100. As such, the lower position of the movable wall 141 corresponds to the decoupling position of the coupler 143 and the locked state of the trim assembly 100, and may alternatively be referred to as the locking position.

The motor 146 is operable to rotate the motor shaft 147 in each of a first direction and a second direction under control of the control assembly 150. Rotation of the shaft 147 in the first direction causes the gear train 145 to rotate the spring 144 in a locking direction, and rotation of the shaft 147 in the second direction causes the gear train 145 to rotate the spring in an unlocking direction. During rotation of the spring 144 in the locking direction, the coils of the spring 144 engage a projection 148 of the wall 141 and urge the wall 141 downward toward its lower locking position, thereby placing the lock mechanism 140 in its locking state. During rotation of the spring 144 in the unlocking direction, the coils of the spring 144 engage the projection 148 and urge the wall 141 upward toward its upper unlocking position, thereby placing the lock mechanism 140 in its unlocking state.

Figure 4:
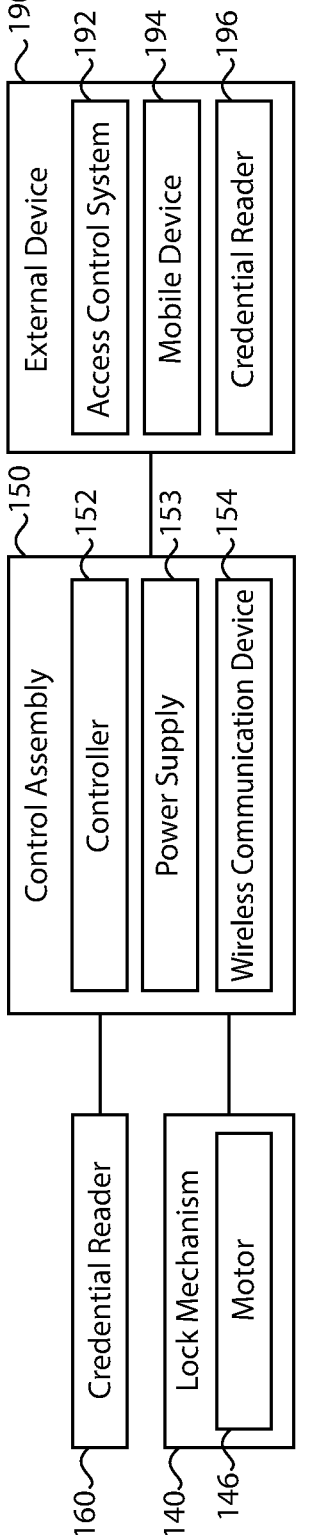
FIG. 4 is a schematic block diagram of the trim assembly illustrated in FIG. 2.

With additional reference to FIG. 4, the control assembly 150 is in communication with the electromechanical lock mechanism 140, and may further be in communication with one or more of the credential reader 160 or an external device 190. The illustrated control assembly 150 includes a controller 152, and may further include a power supply 153 and/or a wireless communication device 154. In certain embodiments, the power supply 153 may be an onboard power supply, such as one or more batteries. In certain embodiments, the control assembly 150 may be connected to an external power supply 153, such as line power. The wireless communication device 154 facilitates wireless communication with an external device 190, such as an access control system 192, a mobile device 194, or an external credential reader 196. It is also contemplated that the control assembly 150 may be in wired communication with an external device 190. In certain embodiments, the control assembly 150 may be provided as a standalone control assembly that does not communicate with an external device 190 during normal operation of the trim assembly 150.

The control assembly 150 is configured to control the electromechanical lock mechanism 140 to move between its locking and unlocking states. For example, the control assembly 150 may transmit to the motor 146 a locking signal that causes the motor 146 to rotate the motor shaft 147 in the first direction, thereby setting the lock mechanism 140 in the locking state as described above. The control assembly 150 may transmit to the motor an unlocking signal that causes the motor 146 to rotate the motor shaft 147 in the second direction, thereby setting the lock mechanism 140 in the unlocking state as described above. In certain embodiments, the control assembly 150 may selectively transmit the locking and unlocking signals based upon information received from the credential reader 160. In certain embodiments, the control assembly 150 may selectively transmit the locking and unlocking signals based upon information received from the external device 190.

In embodiments in which the trim assembly 100 includes the credential reader 160, the credential reader 160 may be mounted to the escutcheon 110. The credential reader 160 is configured to receive a credential input and to transmit to the control assembly 150 credential information relating to the credential input. In certain embodiments, the credential reader 160 may comprise one or more of the following: a keypad operable to receive credential input in the form of an input code; a card reader operable to receive credential input from a card; a fob reader operable to receive credential input from a fob; a mobile device reader operable to receive credential input from a mobile device 194; a biometric credential reader operable to scan or otherwise receive a biometric credential (e.g., a fingerprint scan, an iris scan, or a retina scan). It is also contemplated that the credential reader 160 may take another form, or may be omitted from the trim assembly 100. It is also contemplated that the external credential reader 196 may be provided as one or more of the above-described forms of credential reader, and/or may take another form.

The mechanical lock mechanism 170 is operable to selectively connect the handle 120 to the drive spindle 130, and in the illustrated form comprises a lock cylinder 172, a cam 174 operable to be rotated by the lock cylinder 172, and a lock plate 176 engaged with the cam 174 and the moving wall 141. As is typical of lock cylinders, the lock cylinder 172 generally includes a shell, a plug rotatably mounted in the shell, and a tumbler system operable to selectively prevent rotation of the plug relative to the shell. The plug of the lock cylinder 172 is coupled with the cam 174 such that upon insertion of a proper key into the plug, the key is operable to rotate the plug to thereby rotate the cam 174. One end of the cam 174 is coupled with the plug of the lock cylinder 172, and the opposite end of the cam 174 is engaged with the lock plate 176. For example, a projection 175 of the cam 174 may be received in a slot 177 of the lock plate 176. When the cam 174 is rotated, the projection 175 rides along the slot 177 and urges the lock plate 176 upward. The lock plate 176 is engaged with the movable wall 141 such that upward movement of the lock plate 176 drives the movable wall 141 upward to its unlocking position, thereby unlocking the trim 100. Upon return of the cam 174 to its home position, the lock plate 176 returns to its lower home position, thereby permitting the wall 141 to return to its lower locking position.

As noted above, certain embodiments may omit the electromechanical lock mechanism 140. In such forms, the mechanical lock mechanism 170 may include the moving wall 141 and the coupler 143 to retain the unlocking functionality of the mechanical lock mechanism 140. Moreover, while a particular embodiment of the electromechanical lock mechanism 140 and a particular embodiment of the mechanical lock mechanism 170 are illustrated and described herein, it is to be appreciated that the electromechanical lock mechanism 140 and/or the mechanical lock mechanism 170 may take another form. As one example, the electromechanical lock mechanism 140 may be provided as another form of electromechanical lock mechanism operable to selectively couple the handle 120 with the drive spindle 130, or a form of electromechanical lock mechanism operable to selectively prevent rotation of the handle 120. As another example, the mechanical lock mechanism 140 may be provided as another form of mechanical lock mechanism operable to selectively couple the handle 120 with the drive spindle 130, or a form of mechanical lock mechanism operable to selectively prevent rotation of the handle 120. Such electromechanical and mechanical lock mechanisms are known in the art, and need not be described in detail herein.

Figure 5:
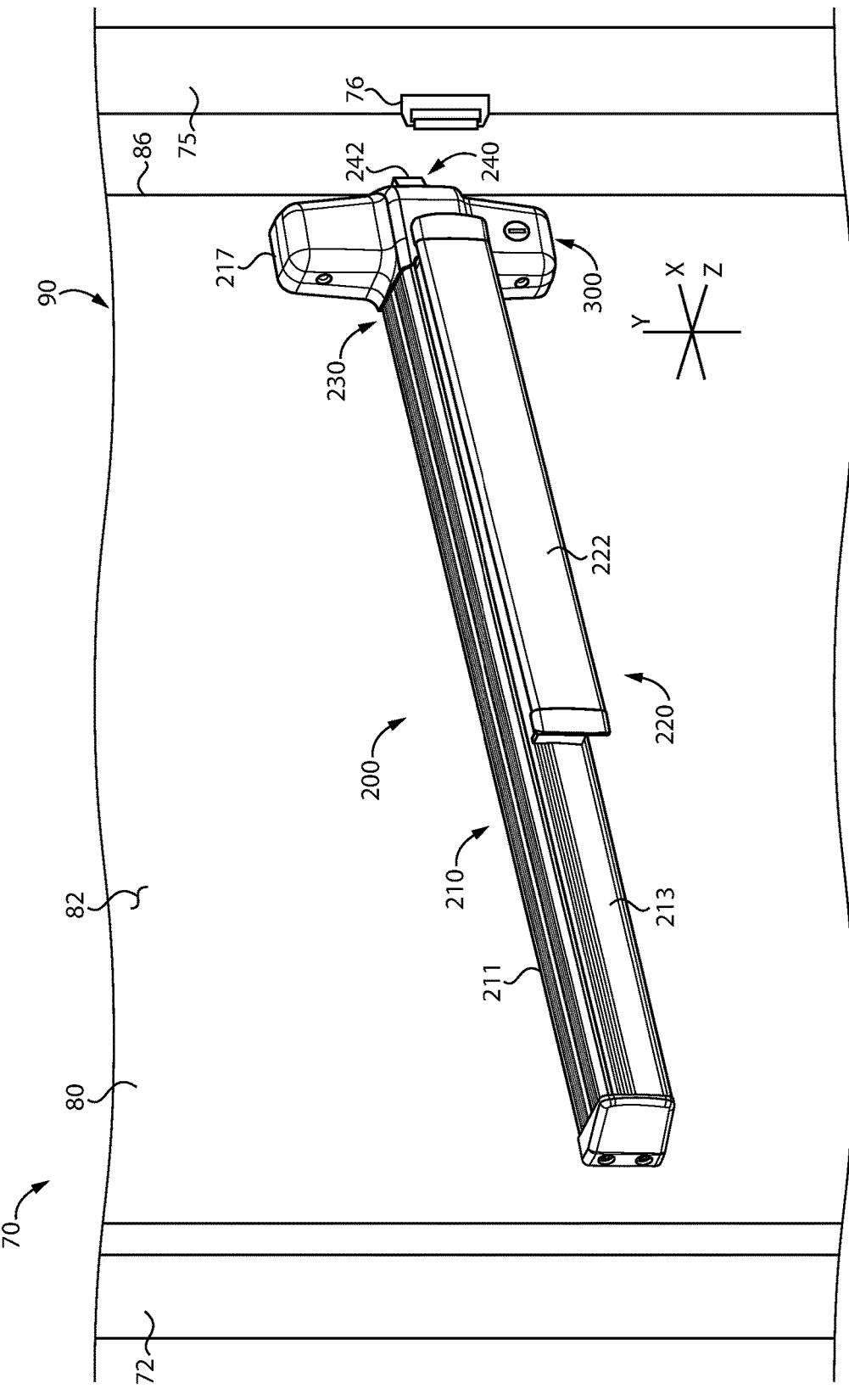
FIG. 5 is a perspective illustration of a pushbar assembly that may be utilized in the exit device assembly illustrated in FIG. 1.

With additional reference to FIG. 5, illustrated therein are certain features of a closure assembly 70 that generally includes the door 80 and the exit device assembly 90. The closure assembly 70 further includes a doorframe 72 on which the door 80 is swingingly mounted. The doorframe 72 includes a latch jamb 75 that is adjacent a free edge 86 of the door 80 when the door 80 is in its closed position. In the illustrated form, the closure assembly 70 further includes a strike 76, which is mounted to the latch jamb 75 and is operable to engage the latch mechanism 240 to selectively retain the door 80 in its closed position.

Figure 6:
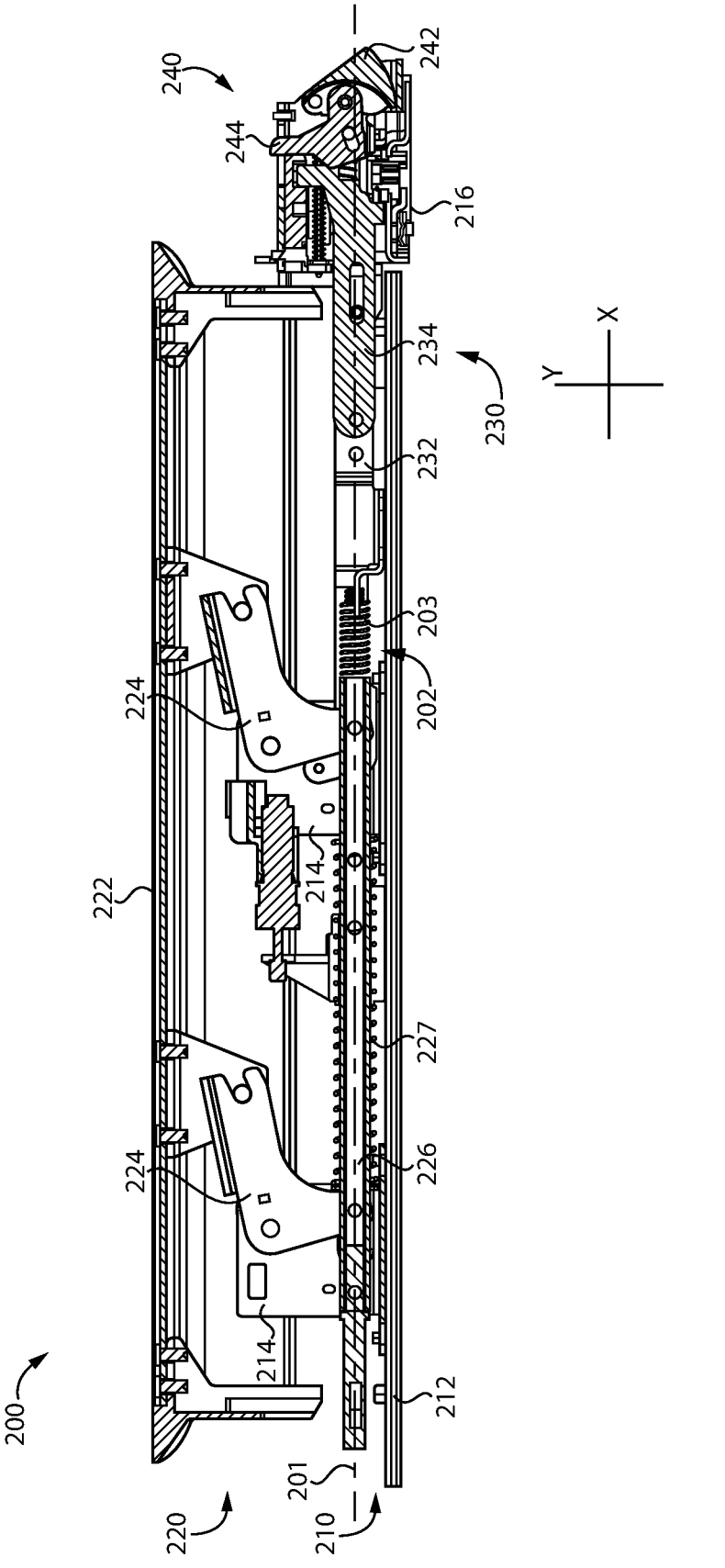
FIG. 6 is a cross-sectional illustration of a portion of the pushbar assembly illustrated in FIG. 5.

With additional reference to FIG. 6, the pushbar assembly 200 generally includes a mounting assembly 210, a drive assembly 220 movably mounted to the mounting assembly 210, a latch control assembly 230 operably coupled with the drive assembly 220, and an actuating device 250 operable to actuate the latch control assembly 230. In the illustrated form, the pushbar assembly 200 further includes the latch mechanism 240.

The mounting assembly 210 generally includes a longitudinally-extending channel member 211, a mounting plate 212 mounted in the channel member 211, a cover plate 213 enclosing a distal end portion of the channel member 211, a pair of bell crank mounting brackets 214 extending transversely from the mounting plate 212, a header plate 216 positioned adjacent a proximal end of the mounting plate 212, and a header case 217 mounted to the header plate 216. As illustrated in FIG. 6, the channel member 211 extends along a longitudinal axis 201 of the pushbar assembly 200.

The drive assembly 220 generally includes a transversely-movable pushbar 222, a pair of bell cranks 224 connecting the pushbar 222 with a longitudinally-movable drive rod 226, and a main spring 227 urging the drive assembly 220 toward a deactuated state. The pushbar 222 is mounted for transverse movement between a projected position and a depressed position to transition the drive assembly 220 between a deactuated state in which the pushbar 222 is in its projected position and an actuated state in which the pushbar 222 is in its depressed position. The bell cranks 224 are mounted to the bell crank brackets 214, and correlate the transverse movement of the pushbar 222 with longitudinal movement of the drive rod 226. More particularly, the bell cranks 224 cause the drive rod 226 to move between a proximal position (to the right in FIG. 4) and a distal position (to the left in FIG. 4) such that the proximal position is correlated with the projected or deactuated position of the pushbar 222 and the distal position is correlated with the depressed or actuated position of the pushbar 222. Additionally, the main spring 227 is engaged between the drive rod 226 and the mounting assembly 210 such that the main spring 227 urges the drive rod 226 toward its proximal position, thereby biasing the drive assembly 220 toward its deactuated state.

The drive assembly 220 is connected with the latch control assembly 230 via a lost motion connection 202 that causes actuation of the latch control assembly 230 in response to actuation of the drive assembly 220, and which permits the drive assembly 220 to remain in its deactuated state when the latch control assembly 230 is actuated by another mechanism (e.g., the trim 100). As a result, the drive assembly 220 is operable to actuate the latch control assembly 230. The lost motion connection 202 may include a biasing member such as a spring 203 urging the latch control assembly 230 toward a deactuated state thereof.

Figure 7:
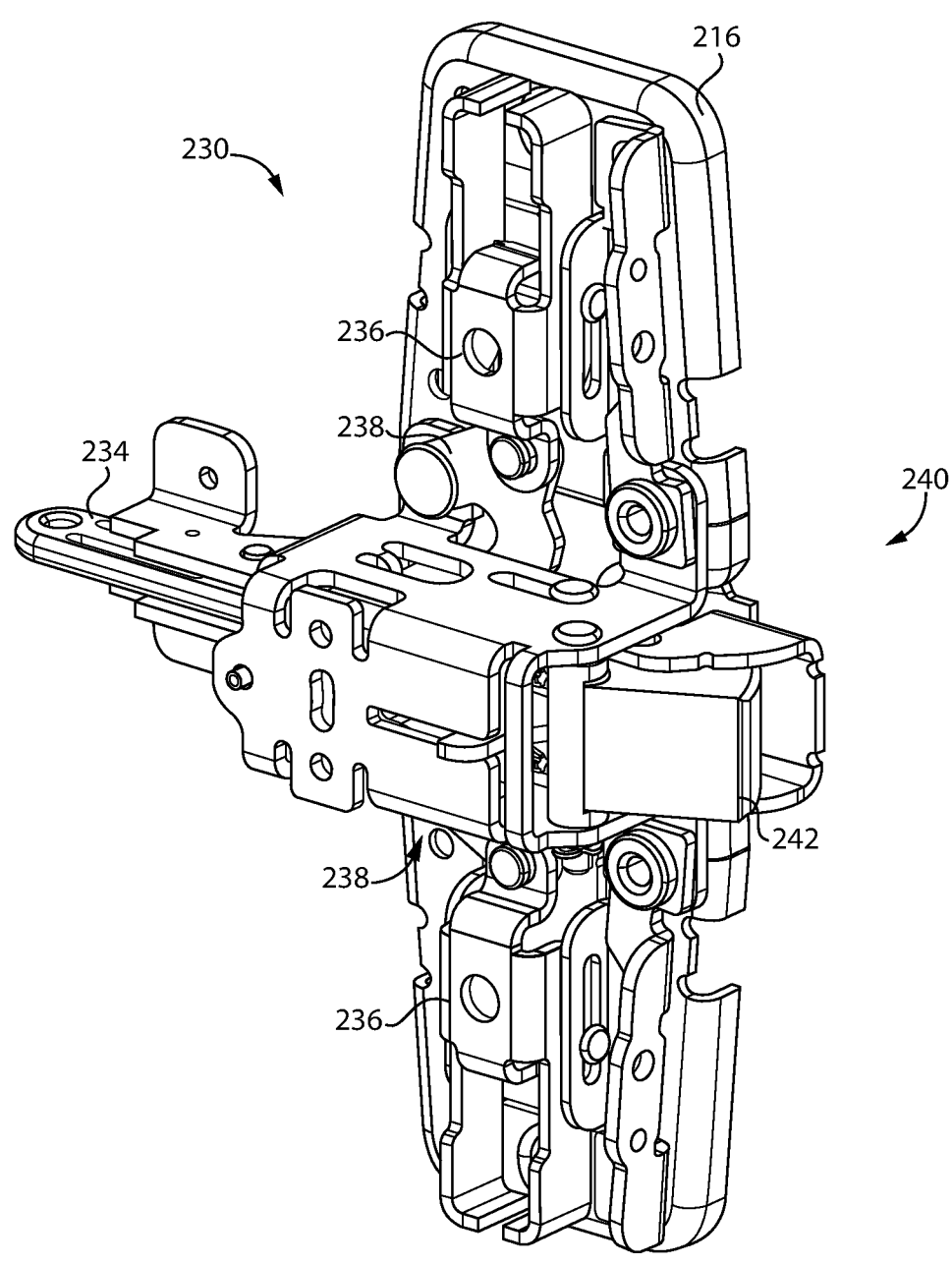
FIG. 7 is a perspective illustration of a portion of the pushbar assembly.

With additional reference to FIG. 7, the latch control assembly 230 generally includes a control link 232 connected with the drive rod 226 via the lost motion connection 202, a yoke 234 connected with the control link 232 for joint movement along the longitudinal axis 201, a pair of drivers 236 mounted to the header plate 316 for lateral movement, and a pair of pivot cranks 238 operably coupling the drivers 236 with the yoke 234. The control link 232 is connected with the drive assembly 220 such that actuation of the drive assembly 220 longitudinally drives the control link 232 and the yoke 234 between a proximal deactuated position and a distal actuated position. The drivers 236 are mounted for lateral movement between a laterally-outward deactuated position and a laterally-inward actuated position, and the pivot cranks 238 correlate longitudinal movement of the control link 232 and yoke 234 with lateral movement of the drivers 236.

As used herein, the terms "laterally inward" and "laterally outward" may be used to denote positions and/or motion relative to the longitudinal axis 201. For example, a laterally inward position is one nearer the longitudinal axis 201, and a laterally outward position is one farther from the longitudinal axis 201. Thus, while the laterally inward and laterally outward positions for the upper driver 236 are respectively provided as a lower position and an upper position, the laterally inward and laterally outward positions for the lower driver 236 are respectively provided as an upper position and a lower position. Similarly, laterally inward movement is movement toward the longitudinal axis 201, while laterally outward movement is movement away from the longitudinal axis 201. Thus, laterally inward movement for the upper driver 236 is downward movement, while laterally outward movement for the upper driver 236 is upward movement. Conversely, laterally inward movement for the lower driver 236 is upward movement, while laterally outward movement for the lower driver 236 is downward movement.

As noted above, the pivot cranks 238 correlate longitudinal movement of the control link 232 and the yoke 234 with lateral movement of the drivers 236. More particularly, the pivot cranks 238 correlate distal movement of the control link 232 and the yoke 234 with laterally inward or actuating movement of the drivers 236, and correlate proximal movement of the control link 232 and the yoke 234 with laterally outward or deactuating movement of the drivers 236. The latch control assembly 230 has an actuating state in which each component thereof is in a corresponding and respective actuating position, and a deactuating state in which each component thereof is in a corresponding and respective deactuating position. For the control link 232 and the yoke 234, the actuating position is a distal position, and the deactuating position is a proximal position. For the drivers 236, the actuating position is a laterally inward position, and the deactuating position is a laterally outward position.

The latch mechanism 240 is operably connected with the latch control assembly 230 such that actuating movement of the latch control assembly 230 causes a corresponding actuation of the latch mechanism 240. In the illustrated form, the latch mechanism 240 generally includes a latchbolt 242 and a retractor 244 connecting the latchbolt 242 with the yoke 234 such that distal actuating movement of the yoke 234 drives the latchbolt 242 from an extended position to a retracted position. As described herein, such actuating movement may be imparted to the latch control assembly 230 by the drive assembly 220, and may also be imparted to the latch control assembly 230 by the trim 100.

In the illustrated form, the latch mechanism 240 is installed in the header case 217, and engages the strike 76 when the door 80 is closed and the pushbar assembly 200 is deactuated. It is also contemplated that the exit device assembly 90 may include latch mechanisms in additional or alternative locations. As one example, the exit device assembly 90 may be provided as a vertical exit device assembly including an upper latch mechanism and/or a lower latch mechanism. In such a vertical exit device, the upper latch mechanism may be installed above the pushbar assembly 200 (e.g., adjacent the top edge of the door 80) and connected to the upper driver 236 via an upper connector (e.g., a rod or cable). Additionally or alternatively, a lower latch mechanism may be installed below the pushbar assembly (e.g., adjacent the bottom edge of the door 80) and connected to the lower driver 236 via a lower connector (e.g., a rod or cable). In certain forms, a vertical exit device may be provided as a concealed vertical exit device, in which the connectors run through channels formed within the door 80. In other embodiments, a vertical exit device may be provided as a surface vertical exit device, in which the connectors are mounted to the egress side 82 of the door 80. An example of a vertical exit device assembly is described below with reference to FIG. 9.

Furthermore, while the illustrated latch mechanism 240 drives a latchbolt 242 between an extended position and a retracted position during actuation and deactuation of the latch mechanism 240, other forms of actuation are also contemplated for the latch mechanism 240. As one example, actuation of the latch mechanism may drive a blocking member from a blocking position to an unblocking position to permit retraction of a bolt without directly driving the bolt to the retracted position. In such forms, deactuation of the latch mechanism may tend to return the blocking member to the blocking position such that, when the bolt returns to its extended position, the blocking member once again retains the bolt in that extended position.

Figure 8:
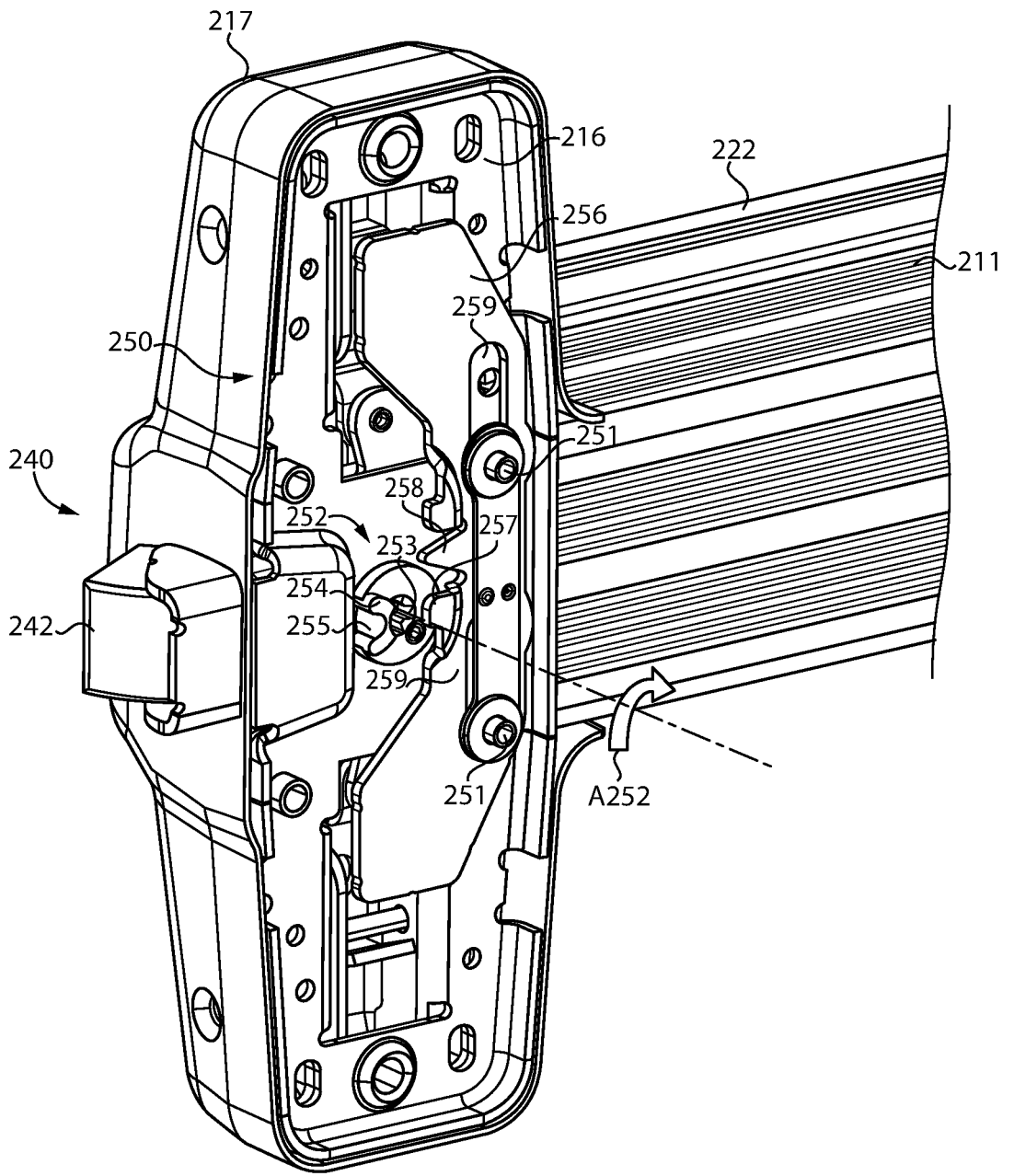
FIG. 8 is a perspective illustration of a portion of the pushbar assembly.

With additional reference to FIG. 8, the actuating device 250 generally includes an actuator 252 rotatably mounted to the header plate 216 and a slide plate 256 slidably mounted to the header plate 216 via a pair of lugs 251. The actuator 252 includes an aperture 253 sized and shaped to receive a tailpiece 345 of the rotation converter 300, and further includes a projection 254 defining a recess 255. The slide plate 256 generally includes a protrusion 257, a finger positioned above the protrusion 257, and a pair of slots 259 that receive the lugs 251.

The actuating device 250 is configured to actuate the latch control assembly 230 in response to rotation of the actuator 252 in an actuator actuating direction A252 (clockwise in FIG. 8). Upon such rotation of the actuator 252, the projection 254 engages the protrusion 257, thereby urging the slide plate 256 downward as the finger 258 enters the recess 255. The slide plate 256 is engaged with the latch control assembly 230 such that downward movement of the slide plate 256 drives the upper driver 236 downward (i.e., in its laterally-inward actuating direction), thereby actuating the latch control assembly 230 and retracting the latchbolt 242. Thus, the first direction (i.e., the direction in which the actuator 252 is rotated to actuate the latch control assembly 230) may be referred to herein as the actuator actuating direction A252.

While the actuating device 250 is operable to actuate the latch control assembly 230 when the actuator 252 is rotated in the actuator actuating direction A252 (clockwise in FIG. 8), the actuating device 250 may be inoperable to actuate the latch control assembly 230 when the actuator 252 is rotated in a second direction opposite the actuator actuating direction A252. In such forms, the second direction may be referred to as the actuator non-actuating direction. In the illustrated form, when the actuator 252 is rotated in the actuator non-actuating direction (counter-clockwise in FIG. 8), the projection 255 engages the protrusion 257 and urges the slide plate 256 upward. However, upward movement of the slide plate 256 is prevented, for example by engagement of the lugs 251 with the ends of the slots 259. As such, the illustrated actuating device 250 is operable to actuate the latch control assembly 230 only when the actuator 252 is rotated in the actuator actuating direction A252, and not when the actuator 252 is rotated in the opposite direction.

As noted above, when the handle 120 is operably connected with the drive spindle 130, the handle 120 is operable to rotate the drive spindle 130 in each of a first direction and a second direction. If the drive spindle 130 were rotationally coupled with the actuator 252, rotating the handle in one direction would rotate the actuator 252 in the actuator actuating direction A252, while rotating the handle in the opposite direction would rotate the actuator 252 from the actuator home position in the actuator non-actuating direction. As such, the trim assembly 100 would only be able to actuate the latch control assembly 230 when the handle 120 is rotated in the correct direction. As described herein, however, the rotation converter 300 is configured to rotate the actuator 252 in the actuator actuating direction A252 in response to rotation of the drive spindle 130 in each and either direction.

Figure 9:
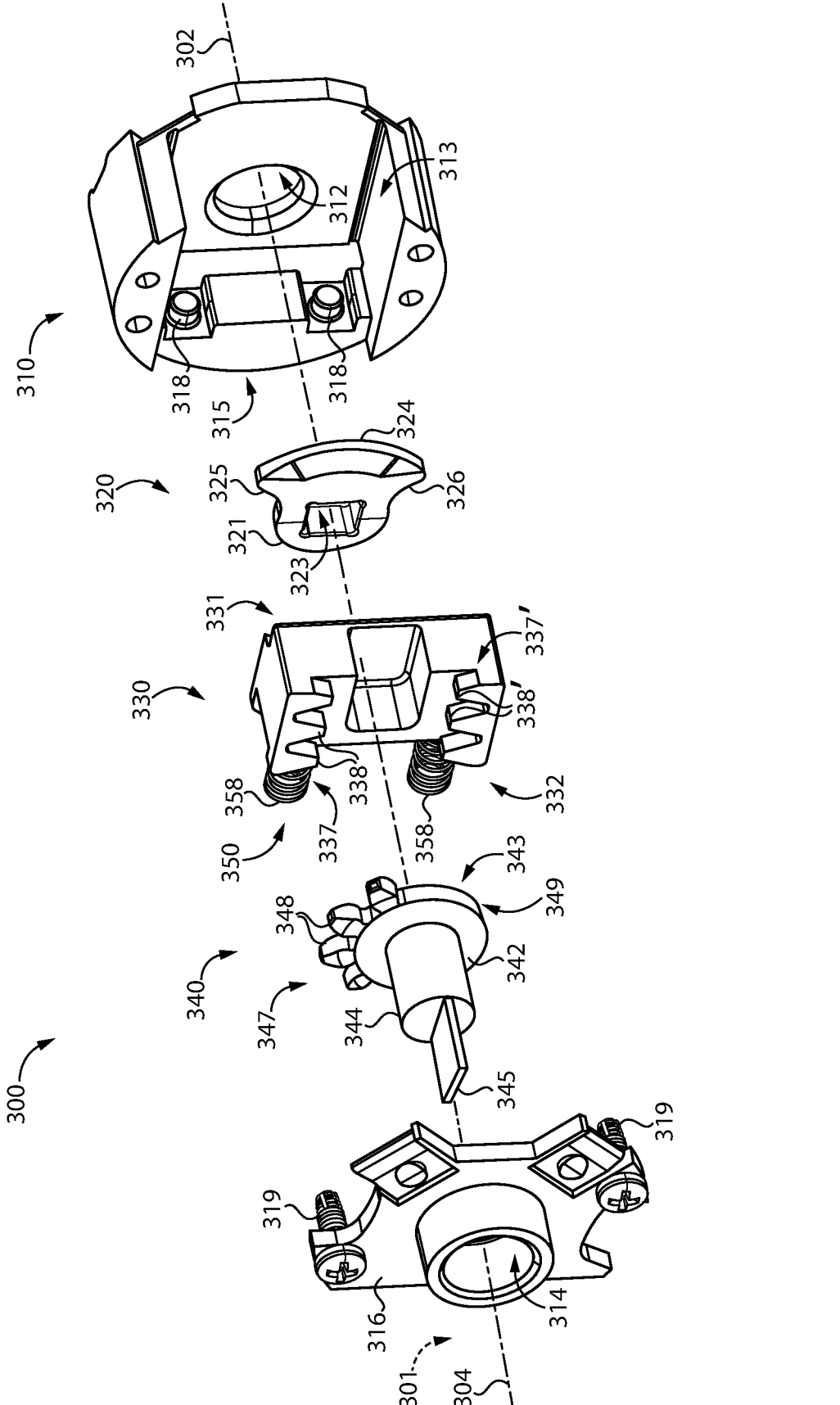
FIGS. 9 and 10 are exploded assembly views of a rotation converter according to certain embodiments, which may be utilized in the exit device assembly illustrated in FIG. 1.
Figure 10:
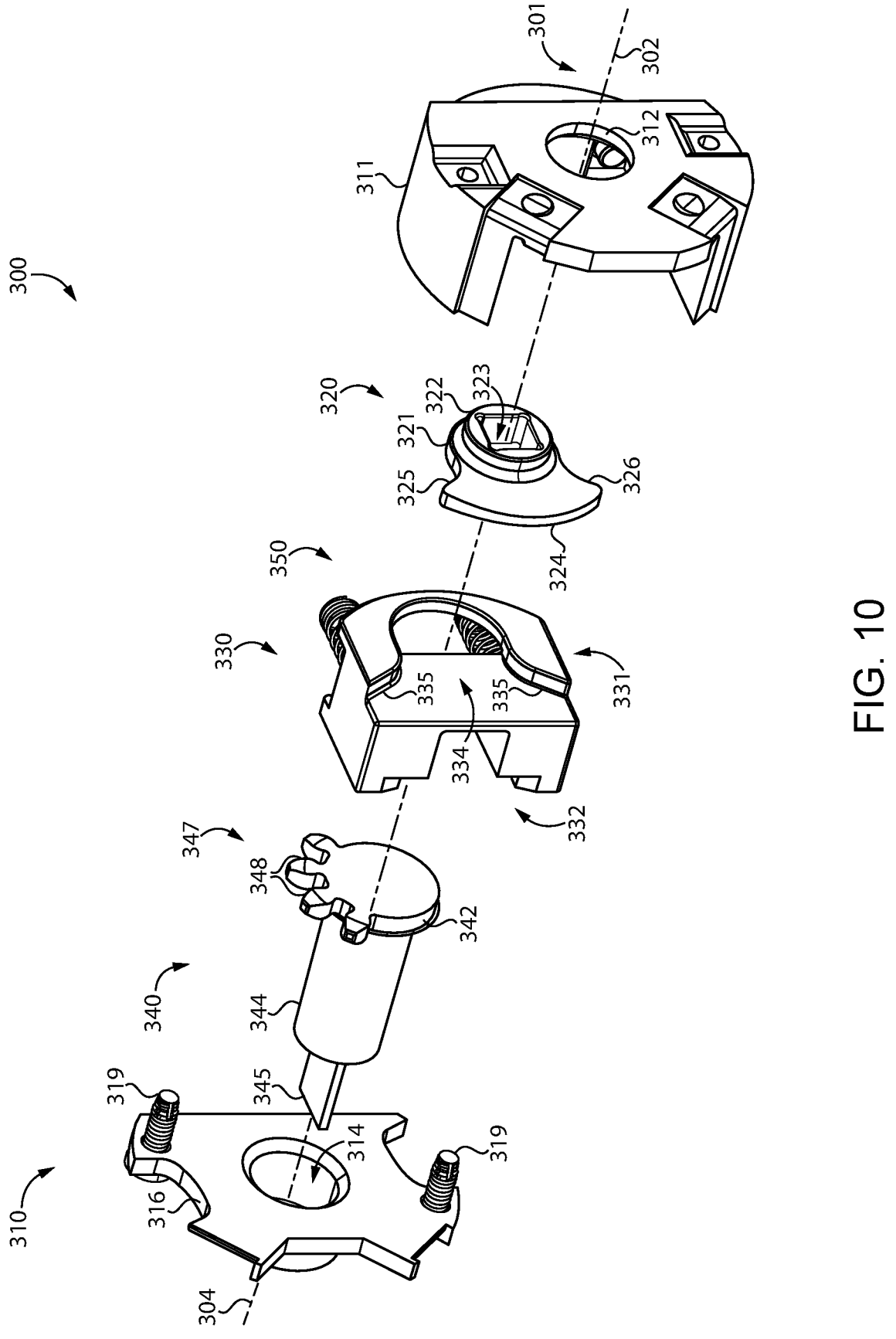

With additional reference to FIGS. 9 and 10, the rotation converter 300 is configured for mounting in the door preparation 85, and generally includes a case 310, an input member in the form of an input cam 320 rotatably mounted to the case 310, a shuttle 330 slidably mounted in the case 310 and engaged with the input cam 320, an output member 340 rotatably mounted to the case 310 and engaged with the shuttle 330, and a biasing mechanism 350 urging the shuttle 330 toward a home position. As described herein, the input cam 320 is configured for connection with the drive spindle 130, the output member 340 is configured for connection with the actuator 252, and the shuttle 330 is configured to rotate the output member 340 in an output member actuating direction A340 in response to rotation of the input cam 320 in each and either of a first direction and a second direction. The rotation converter 300 has an input rotational axis 302 about which the input cam 320 rotates and an output rotational axis 304 about which the output member 340 rotates. In the illustrated form, the rotational axes 302, 304 are coincident and define a rotational axis 301 of the rotation converter 300. In other forms, the axes 302, 304 may not necessarily be coincident with each other.

The case 310 is configured for mounting in the door preparation 85, and generally includes a housing 311 and a cover plate 316. The housing 311 defines a first bearing aperture 312 centered about the input rotational axis 302, a receiving space 313 connected with the first bearing aperture 312, and a mounting area 315 positioned in the receiving space 313. The cover plate 316 includes a second bearing aperture 314 centered about the output rotational axis 304, and is coupled to the housing 311, for example by one or more threaded fasteners 319 such as screws. As described herein, the input cam 320 is rotatably supported by the first bearing aperture 312, the shuttle 330 is slidably mounted in the receiving space 313, the output member 340 is rotatably supported by the second bearing aperture 314, and the biasing mechanism 350 is mounted in the mounting area 315 and engaged with the shuttle 330.

The input cam 320 generally includes a circular base plate 321, a bearing boss 322 projecting from the base plate 321, an aperture 323 sized and shaped to receive the drive spindle 130, and an ear 324 projecting radially from the base plate 321. The bearing boss 322 is received in the first bearing aperture 312 such that the input cam 320 is rotatably supported by the housing 311 and is rotatable about the input rotational axis 302. In the illustrated form, the aperture 323 has a generally square geometry corresponding to the generally square geometry of the illustrated drive spindle 130. It is also contemplated that the drive spindle 130 and/or the aperture 323 may have a different geometry, so long as the input cam 320 is operable to engage the drive spindle 130. The ear 324 includes a first engagement portion 325 and a second engagement portion 326 angularly spaced from the first engagement portion 325. As described herein, each of the engagement portions 325, 326 is operable to engage the shuttle 330 to linearly drive the shuttle 330 in response to rotation of the input cam 320.

The shuttle 330 is slidably seated in the receiving space 313 for movement between a shuttle home position and a shifted or shuttle actuated position, and includes an input side 311 engaged with the input cam 320 and an output side 312 engaged with the output cam 340. The input side 311 includes a recessed portion 314 in which the input cam 320 is seated. The recessed portion 314 includes a first cam surface 335 operable to be engaged by the first engagement portion 325 and a second cam surface 336 operable to be engaged by the second engagement portion 326. The output side 312 includes a rack gear 337 comprising one or more teeth 338, and in the illustrated form further comprises a second rack gear 337'. The second rack gear 337' is positioned opposite the first rack gear 337 and comprises one or more teeth 338'.

The output member 340 generally includes a base plate 342 and a bearing post 344 extending from the base plate 342, and may further include a tailpiece 345 extending from the post 344. The bearing post 344 extends into the second bearing aperture 314 such that the output cam 340 is rotatably supported by the housing 311 and is rotatable about the output rotational axis 304. The tailpiece 345 is configured for rotational coupling with the actuator 252 of the actuating device 250, and in the illustrated form is integrally formed with or otherwise coupled to the post 344. It is also contemplated that the post 344 may be rotationally coupled with the tailpiece 345 in another manner. For example, the post 344 may include a slot or recess in which a portion of the tailpiece 345 is seated such that the post 344 and the tailpiece 345 are rotationally coupled with one another. In such forms, the post 344 and the tailpiece 345 may be longitudinally decoupled from one another to allow for sliding movement of the tailpiece 345 along the output rotational axis 304. The base plate 342 defines a partially toothed pinion gear 343 including a toothed region 347 engaged with the rack gear 337 to form a rack-and-pinion device 307. More particularly, the toothed region 347 includes one or more teeth 348 engaged with the one or more teeth 338 of the rack gear 337. The partially-toothed pinion gear 343 further includes an untoothed region 349 that faces the second rack gear 337' without engaging the second rack gear 337'.

The biasing mechanism 350 is seated in the mounting area 315 and is engaged between the housing 311 and the shuttle 330 such that the biasing mechanism 350 biases the shuttle 330 toward the shuttle home position. In the illustrated form, the biasing mechanism 350 includes two biasing members in the form of compression springs 358. The mounting area 315 may include a pair of lugs 318 on which the compression springs 358 are mounted, and the shuttle 330 may include a pair of recesses into which the springs 358 extend. While the illustrated biasing mechanism 350 includes two biasing members, it is also contemplated that more or fewer biasing members may be utilized. Moreover, while the illustrated biasing members are provided in the form of compression springs 358, it is also contemplated that one or more biasing members of the biasing mechanism 350 may be provided in another form. For example, the biasing mechanism 350 may include one or more of the following: an extension spring, a torsion spring, a leaf spring, an elastic member, one or more magnets, and/or other forms of biasing members.

Figure 11:
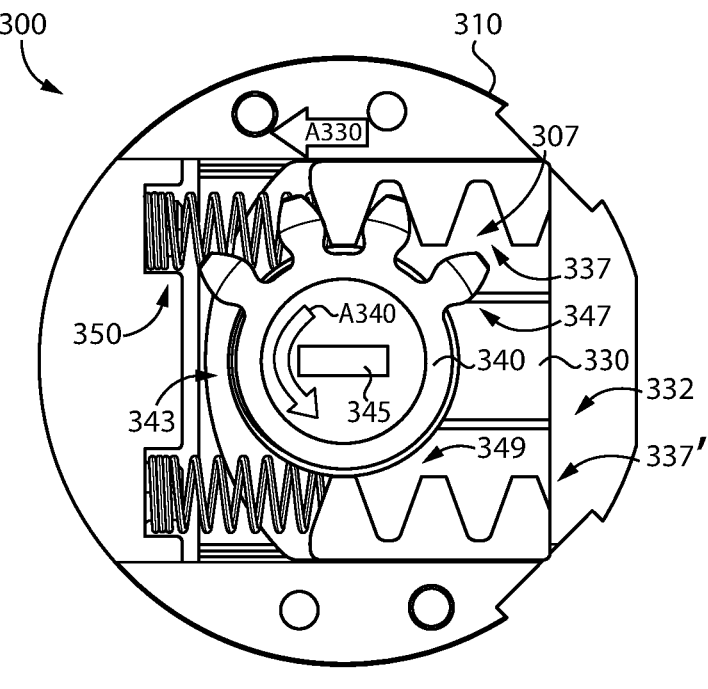
FIG. 11 is a plan view of a portion of the rotation converter illustrated in FIGS. 9 and 10 while in a deactuated state.
Figure 12:
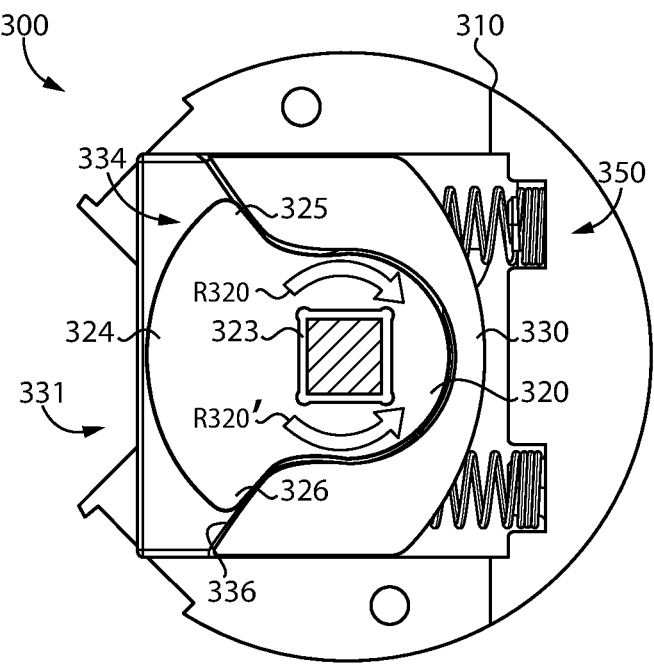
FIG. 12 is a plan view of a portion of the rotation converter illustrated in FIGS. 9 and 10 while in the deactuated state.

With additional reference to FIGS. 11 and 12, illustrated therein is the rotation converter 300 in a deactuated state. In this state, each of the input cam 320, the shuttle 330, and the output cam 340 is in its corresponding and respective home position. This deactuated state of the rotation converter 300 corresponds to the deactuated state of the trim assembly 100, in which each of the handle 120 and the drive spindle 130 is in its corresponding and respective home position. The rotation converter 300 is biased toward its deactuated state at least in part by the biasing mechanism 350, which urges the shuttle 330 toward its home position. Biasing of the shuttle 330 toward its home position results in biasing of the input cam 320 toward its home position due to engagement of at least one of the cam surfaces 335, 336 with its corresponding engagement portion 325, 326. Biasing of the shuttle 330 toward its home position also results in biasing of the output member 340 toward its home position due to engagement of the rack gear 337 with the toothed region 347 of the pinion gear 343.

Figure 13:
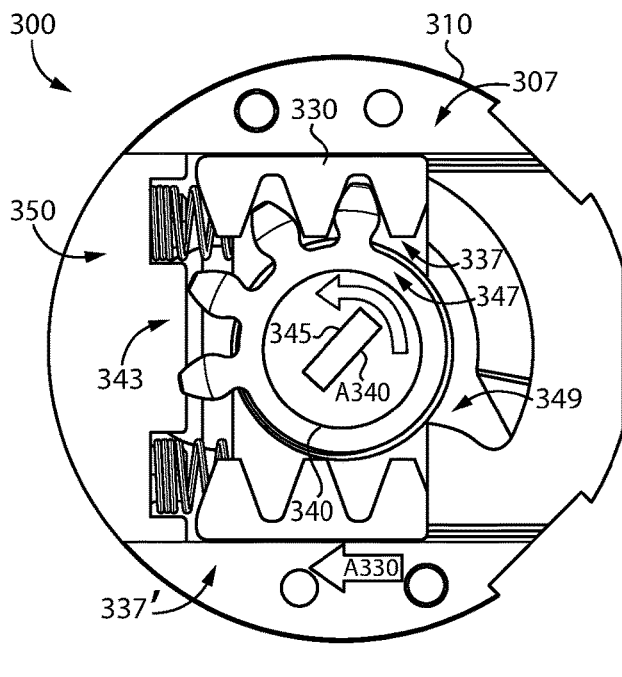
FIG. 13 is a plan view of a portion of the rotation converter illustrated in FIGS. 9 and 10 while in an actuated state.

With additional reference to FIG. 13, illustrated therein is a rear plan view of the rotation converter 300 in its actuated state. In this state, the shuttle 330 has been shifted to its actuated or shifted position, resulting in rotation of the output member 340 to its actuated or rotated position. More particularly, shifting of the shuttle 330 to its actuated position causes the engaged rack gear 337 and pinion 343 to rotate the output member 340 in the output member actuating direction A340, which in the illustrated embodiment is the same as the actuator actuating direction A252. Due to the fact that the output member 340 is rotationally coupled with the actuator 352 (e.g., via the tailpiece 345), such rotation of the output member 340 in its actuating direction A340 causes a corresponding rotation of the actuator 252 in its actuating direction A252, thereby actuating the latch control assembly 230 as described above. Thus, actuation of the rotation converter 300 causes a corresponding actuation of the latch control assembly 230.

Figures 14, 15:
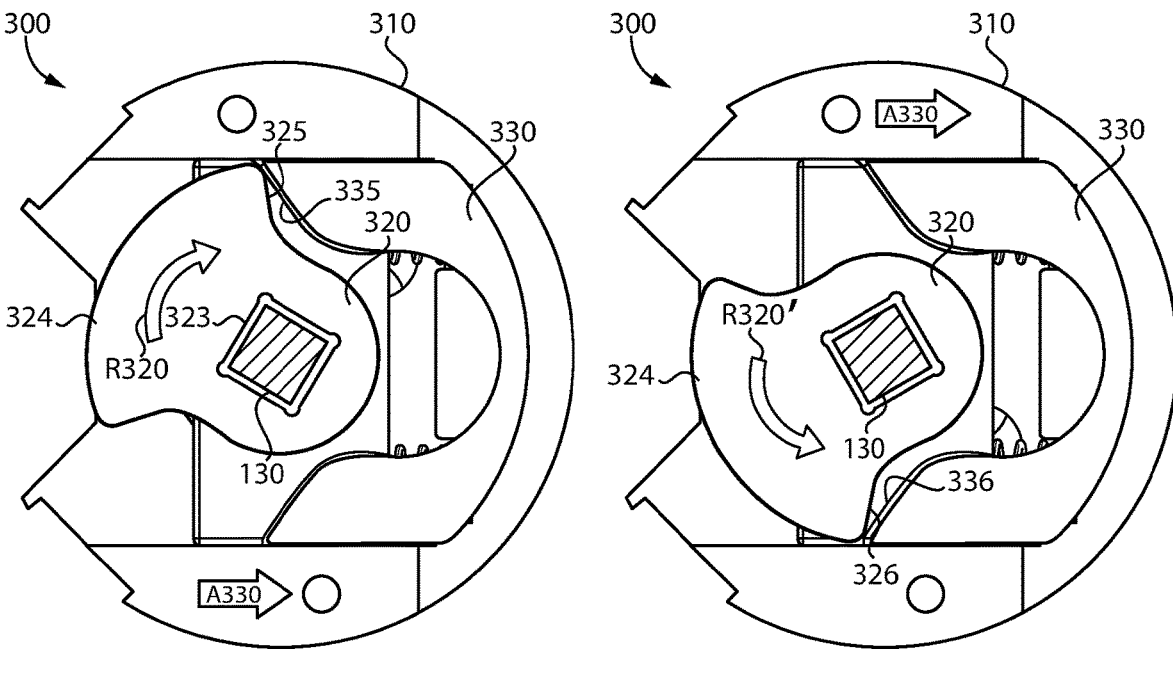
FIG. 14 is a plan view of a portion of the rotation converter illustrated in FIGS. 9 and 10 while in a first actuated state.
FIG. 15 is a plan view of a portion of the rotation converter illustrated in FIGS. 9 and 10 while in a second actuated state.

With additional reference to FIG. 14, the rotation converter 300 can be actuated by causing rotation of the input cam 320 in an input cam first rotational direction R320 (clockwise in FIG. 14) from the input cam home position (FIG. 12) to an input cam first rotational position (FIG. 14). The input cam 320 may, for example, be rotated in the input cam first rotational direction R320 by rotating the handle 120 in a handle first rotational direction while the handle 120 is engaged with the drive spindle 130. Such rotation of the handle 120 in the handle first rotational direction causes a corresponding rotation of the drive spindle 130 in a drive spindle first rotational direction, thereby rotating the input cam 320 in the input cam first rotational direction R320. Rotation of the input cam 320 in the input cam first rotational direction R320 (clockwise in FIG. 14) causes the first engagement portion 325 of the input cam 320 to engage the first cam surface 335 of the shuttle 330 such that the input cam 320 drives the shuttle 330 in the shuttle actuating direction A330 (to the left in FIGS. 11 and 13, to the right in FIGS. 12 and 14). Shifting of the shuttle 330 in the shuttle actuating direction A330 causes a corresponding rotation of the output member 340 in the output member actuating direction A340, thereby actuating the latch control assembly 230 as described above. Thus, the rotation converter 300 converts rotation of the input cam 320 from the input cam home position in the input cam first rotational direction R320 to rotation of the output member 340 in the output member actuating direction A340.

With additional reference to FIG. 15, the rotation converter 300 can be actuated by causing rotation of the input cam 320 in an input cam second rotational direction R320' (counter-clockwise in FIG. 15) from the input cam home position (FIG. 12) to an input cam second rotational position (FIG. 15). The input cam 320 may, for example, be rotated in the input cam second rotational direction R320' by rotating the handle 120 in a handle second rotational direction while the handle 120 is engaged with the drive spindle 130. Such rotation of the handle 120 in the handle second rotational direction causes a corresponding rotation of the drive spindle 130 in a drive spindle second rotational direction, thereby rotating the input cam 320 in the input cam second rotational direction R320'. Rotation of the input cam 320 in the input cam second rotational direction R320' (counter-clockwise in FIG. 15) causes the second engagement portion 326 of the input cam 320 to engage the second cam surface 336 of the shuttle 330 such that the input cam 320 drives the shuttle 330 in the shuttle actuating direction A330 (to the left in FIGS. 11 and 13, to the right in FIGS. 12 and 15). Shifting of the shuttle 330 in the shuttle actuating direction A330 causes a corresponding rotation of the output member 340 in the output member actuating direction A340, thereby actuating the latch control assembly 230 as described above. Thus, the rotation converter 300 converts rotation of the input cam 320 from the input cam home position in the input cam second rotational direction R320' to rotation of the output member 340 in the output member actuating direction A340.

Regardless of whether the drive spindle 130 has been rotated from the home position in the first drive spindle direction or the second drive spindle direction, the drive spindle 130 may return to the drive spindle home position after driving the shuttle 330 to the shuttle actuated position. Such return of the drive spindle 130 to the drive spindle home position causes a corresponding return of the input cam 320 to the input cam home position. As the input cam 320 returns to its home position, the biasing mechanism 350 urges the shuttle 330 in a shuttle deactuating direction opposite the shuttle actuating direction A330. As the shuttle 330 moves in the shuttle deactuating direction, the rack-and-pinion mechanism 307 returns the output member 340 to the output member home position, thereby returning the actuator 252 to the actuator home position and deactuating the latch control assembly 230. Thus, the rotation converter 300 converts rotation of the input cam 320 toward the input cam home position to rotation of the actuator 252 toward the actuator home position.

As should be appreciated from the foregoing, the rotation converter 300 is configured to convert rotation of the input cam 320 in each and either direction from the input cam home position (i.e., each and either of the input cam first rotational direction R320 and the input cam second rotational direction R320') into rotation of the output member 340 in a single actuating direction A340. This capability may be referred to herein as the capability of converting bidirectional rotation to unidirectional rotation. With this capability, regardless of whether the drive spindle 130 is rotated from the drive spindle home position in the drive spindle first rotational direction (e.g., counter-clockwise in FIG. 2) or the drive spindle second rotational direction (e.g., clockwise in FIG. 2), the output of the rotation converter 300 will be the same. More particularly, the output of the rotation converter 300 will be an output that rotates the actuator 252 in its actuating direction A252 from the actuator home position to the actuator actuated position. As a result, the handle 120 can be installed in either of a left-handed orientation or a right-handed orientation, and when the handle 120 is coupled with the drive spindle 130, the handle 120 can be rotated in either direction from the handle home position to actuate the latch control assembly 230.

In the illustrated form, when the handle 120 is engaged with the drive spindle 130, the handle 120, the drive spindle 130, and the input cam 320 are rotationally coupled such that each of the first directions is the same direction, and each of the second directions is the same direction. For example, the handle first rotational direction (counter-clockwise in the orientation of FIG. 2) is the same as the drive spindle first rotational direction (counter-clockwise in the orientation of FIG. 2 and clockwise in the orientation of FIG. 14), which is the same as the input cam first rotational direction (clockwise in the orientation of FIG. 14). Similarly, the handle second rotational direction (clockwise in the orientation of FIG. 2) is the same as the drive spindle second rotational direction (clockwise in the orientation of FIG. 2 and counter-clockwise in the orientation of FIG. 14), which is the same as the input cam second rotational direction (counter-clockwise in the orientation of FIG. 14).

It is also contemplated that one or more of the components may rotate in an opposite direction as one or more of the other components. For example, should the handle 120 be engaged with the drive spindle 130 via one or more gears, the drive spindle 130 may rotate in an opposite direction as the handle 120. In such forms, the handle first rotational direction (e.g. clockwise in the orientation of FIG. 2) may be different from the drive spindle first direction (e.g., counter-clockwise in the orientation of FIG. 2).

In the configuration illustrated in FIGS. 11 and 13, the output member 340 is installed in a first orientation, in which the toothed region 347 engages the rack gear 337 and the untoothed region 349 faces the second rack gear 337' without engaging the second rack gear 337'. As a result, movement of the shuttle 330 in the shuttle actuating direction A330 (to the left in FIGS. 11 and 13) causes a corresponding rotation of the output member 340 in an output member first actuating direction A340 (counter-clockwise in FIG. 11).

Figure 16:
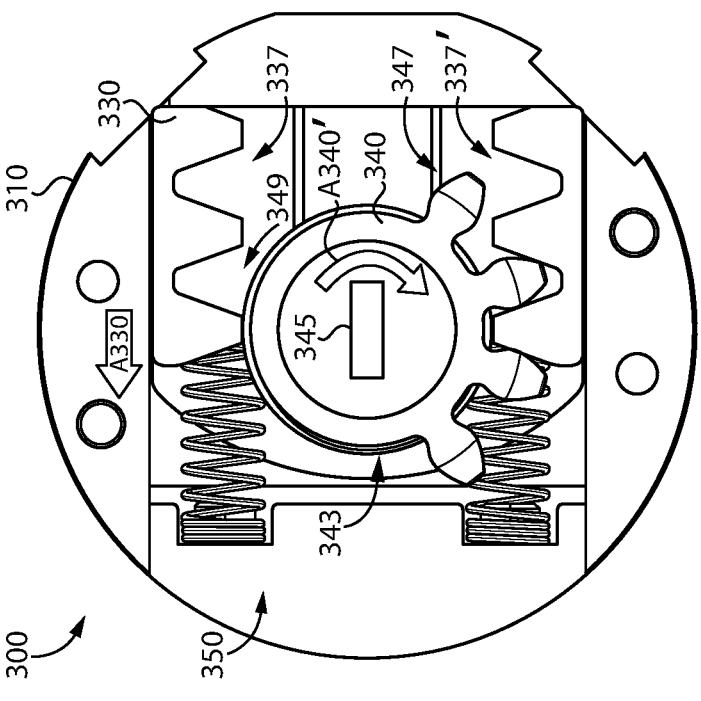
FIG. 16 is a plan view of a portion of the rotation converter illustrated in FIGS. 9 and 10 with an output member in a reversed orientation.

With additional reference to FIG. 16, illustrated therein is the rotation converter 300 with the output member 340 installed in a second orientation opposite the first orientation. More particularly, the second orientation is about 180° offset from the first orientation about the output rotational axis 304. In this second or reversed orientation, the toothed region 347 engages the second rack gear 337' and the untoothed region 349 faces the rack gear 337 without engaging the rack gear 337. As a result, movement of the shuttle 330 in the shuttle actuating direction A330 (to the left in FIG. 16) causes a corresponding rotation of the output member 340 in an output member second actuating direction A340' (clockwise in FIG. 16).

As should be evident from the foregoing, the illustrated output member 340 is reversible to alter the output member actuating direction. Such reversibility may be advantageous to the installer. For example, while the actuating device 250 of the illustrated pushbar assembly 200 is configured to actuate the latch control assembly 230 when the actuator 252 is rotated in a first rotational direction (counter-clockwise in FIG. 8), it is also contemplated that a pushbar assembly may include an actuating device that actuates a latch control assembly when an actuator is rotated in a second rotational direction opposite the first rotational direction. In such forms, the same rotation converter 300 may be utilized to rotate the output member 340 in the second rotational direction. More particularly, the cover plate 316 may be removed to expose the output member 340, the output member 340 may be removed and replaced in the second orientation, and the cover plate 316 may be reinstalled to close the housing 300. With the output member 340 in the reversed orientation, the rotation converter 300 will be configured to convert bidirectional rotation to unidirectional rotation in the second rotational direction A340'.

In the illustrated form, the output member 340 is reversible between the first and second orientations to alter the output member actuating direction as described above. It is also contemplated that the output member 340 may not necessarily be reversible. By way of example, one of rack gears 337, 337' may be omitted. In such forms, the pinion gear 343 may be fully toothed, or may remain partially toothed.

Figure 17:
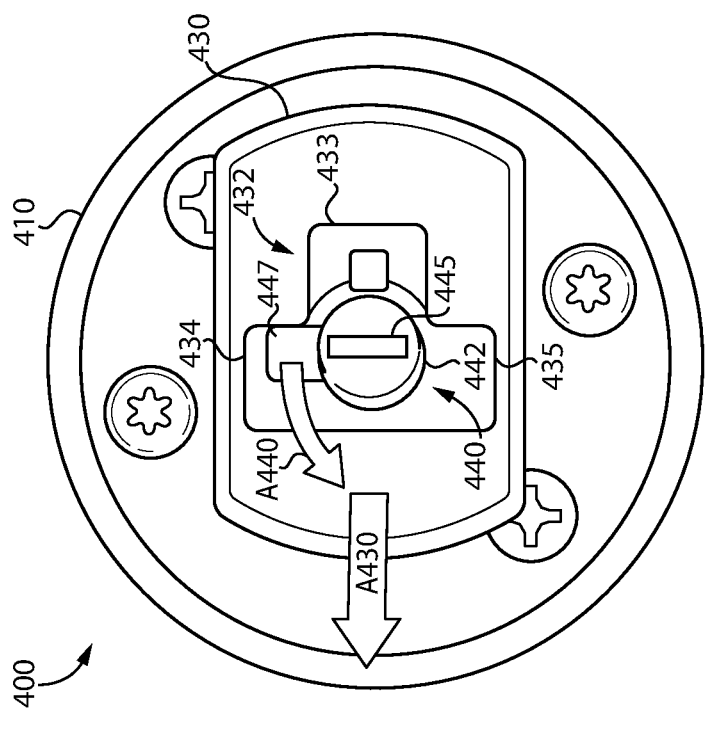
FIG. 17 is a plan view of a rotation converter according to certain embodiments, which may be utilized in the exit device assembly illustrated in FIG. 1.

With additional reference to FIG. 17, illustrated therein is a rotation converter 400 according to certain embodiments. The rotation converter 400 is substantially similar to the above-described rotation converter 300, and generally includes a housing 410, an input cam, a shuttle 430, an output member 440, and a biasing mechanism, which respectively correspond to the above-described housing 311, input cam 320, shuttle 330, output member 340, and biasing mechanism 350. In the interest of conciseness, the following description of the rotation converter 400 focuses primarily on elements and features that are different from those described above with reference to the rotation converter 300.

As with the above-described shuttle 330, the shuttle 430 has a shuttle home position (illustrated in FIG. 17), and is movable in a shuttle actuating direction A430 toward a shuttle actuated position. Actuation of the shuttle 430 may, for example, take place along the lines set forth above with reference to actuation of the shuttle 330. The shuttle 430 includes an aperture 432 that includes a first recess 433 and a second recess 434 extending away from the first recess 433 at a right angle, and which in the illustrated form further includes a third recess 435 opposite the second recess 434. As described herein, the aperture 432 receives the output member 440 and aids in rotating the output member 440 in the output member actuating direction as the shuttle 430 is driven in the shuttle actuating direction A430.

The output member 440 is somewhat similar to the above-described output member 340, and generally includes a base plate 442, a post extending from the base plate 442, and a tailpiece 445 extending from the post. However, in place of the toothed region 347, the illustrated output member 440 includes a radial projection 447 that extends into the second recess 434.

As should be appreciated, the shuttle 430 can be driven in the shuttle actuating direction A430 by rotation of the input cam in either direction from the input cam home position, for example as described above with reference to the input cam 320 and the shuttle 330. During movement of the shuttle 430 in the shuttle actuating direction A430, one edge of the second recess 434 (the right edge in FIG. 17) engages the radial projection 447, thereby driving the output member 440 in the output member actuating direction A440 (counter-clockwise in FIG. 17) as the base plate 442 enters the first recess 433. Such rotation of the output member 440 in the output member actuating direction A440 from the output member home position drives the actuator 252 from the actuator home position to the actuator actuated position, thereby actuating the latch control assembly 230 as described above. As the input cam returns to the input cam home position (e.g., in response to rotation of the drive spindle 130 to the drive spindle home position), a second edge of the second recess (the left edge in FIG. 17) engages the radial projection, thereby returning the output member 440 to the output member home position. Such return of the output member 440 to the output member home position causes a corresponding return of the actuator 252 to the actuator home position, thereby deactuating the latch control assembly 230 as described above.

In the illustrated form, the output member 440 is revers- ible in a manner analogous to that described above with reference to the output member 430. More particularly, the output member 440 can be removed from the rotation converter 400, rotated by about 180° about its rotational axis, and reinstalled to the rotation converter 400 such that the radial projection 447 extends into the third recess 435. With the output member 440 installed in this second orien- tation, movement of the shuttle 430 in the shuttle actuating direction A430 drives the output member 440 in a output member second actuating direction (clockwise in FIG. 17) opposite the output member first actuating direction A440 (counter-clockwise in FIG. 17). The ability to alter the actuating direction of the output member 440 may be advantageous for reasons analogous to those set forth above with reference to the reversibility of the output member 340.

While two illustrative forms of rotation converters 300, 400 have been illustrated and described herein, it is to be appreciated that rotation converters according to other embodiments may take other forms. As one example, a rotation converter according to certain embodiments may include one or more ratchets that convert bidirectional rotation of the drive spindle 130 from its home position to unidirectional rotation of the actuator 252 in the actuator actuating direction from the actuator home position. As another example, a rotation converter according to certain embodiments may include a four bar linkage that converts bidirectional rotation of the drive spindle 130 from its home position to unidirectional rotation of the actuator 252 in the actuator actuating direction from the actuator home position.

With additional reference to FIG. 18, illustrated therein is a process 500 according to certain embodiments. Blocks illustrated for the processes in the present application are understood to be examples only, and blocks may be com- bined or divided, and added or removed, as well as re- ordered in whole or in part, unless explicitly stated to the contrary. Additionally, while the blocks are illustrated in a relatively serial fashion, it is to be understood that two or more of the blocks may be performed concurrently or in parallel with one another. Moreover, while the process 500 is described with specific reference to the trim assembly illustrated in FIGS. 2-4 and the pushbar assembly illustrated in FIGS. 5-8, it is to be appreciated that the process 500 may be performed using a trim assembly of another form and/or a pushbar assembly of another form. Similarly, while the process 500 is described herein with specific reference to the rotation converter 300 illustrated in FIGS. 9-16, it is to be appreciated that the process 500 may be performed with rotation converters having additional or alternative features, including but not limited to the rotation converter 400.

The process 500 generally relates to the installation and/or operation of an exit device assembly, the exit device assem- bly including a trim assembly mounted to a non-egress side of a door, a pushbar assembly mounted to an egress side of the door, and a rotation converter installed to a door prepa- ration formed within the door. In the illustrated form, the process 500 generally relates to the installation and/or operation of the exit device assembly 90, in which the trim assembly 100 is installed to the non-egress side 81 of the door 80, the pushbar assembly 200 is installed to the egress side 82 of the door 80, and the rotation converter 300 is installed to the door preparation 85. Generally speaking, the trim assembly includes a drive spindle, and the pushbar assembly includes an actuator. While other forms are con- templated, in the illustrated form, the trim assembly 100 includes a drive spindle 130 and a handle 120 at least selectively operable to rotate the drive spindle 130, and the pushbar assembly 200 includes a latch control assembly 230 and an actuator 252 operable to actuate the latch control assembly 230 when rotated in an actuating direction from an actuator home position to an actuator actuated position.

The illustrated process 500 generally includes an instal- lation procedure 510, a rotation converting procedure 520, an actuation procedure 530, and a deactuation procedure 540. The installation procedure 510 generally involves installing at least a portion of the exit device assembly 90 to the door 80, the rotation converting procedure 520 generally involves converting bidirectional rotation of the drive spindle 130 to unidirectional rotation of the actuator 252, the actuation procedure 530 generally involves actuating the latch control assembly 230 in response to rotation of the actuator 252, and the deactuating procedure 540 generally involves deactuating the exit device assembly 90.

The process 500 may begin with an installation procedure 510, which generally involves installing at least a portion of an exit device assembly to a door. In certain forms, the installation procedure 510 may involve block 512, which generally involves installing a pushbar assembly to an egress side of a door. For example, block 512 may involve install- ing the pushbar assembly 200 to the egress side 82 of the door 80 such that the actuator 252 is aligned with and accessible via the door preparation 85.

The installation procedure 510 may include block 514, which generally involves engaging an output member of a rotation converter with the actuator of the exit device. For example, block 514 may involve seating the rotation con- verter 300 in the door preparation 85 and engaging the output member 340 with the actuator 252 via a tailpiece 345. In certain embodiments, the tailpiece 345 may be coupled with one of the actuator 252 or the output member 340. In certain embodiments, the tailpiece 345 may be slidingly engaged with each of the actuator 252 and the output member 340. In further embodiments, block 514 may involve engaging the output member 340 with the actuator 252 in another manner (e.g. via one or more gears) to correlate rotation of the actuator 252 with rotation of the output member 340.

The installation procedure 510 may include block 516, which generally involves engaging an input member of the rotation converter with a drive spindle of the trim assembly. For example, block 516 may involve inserting the drive spindle 130 into the aperture 323 of the input cam 320 to rotationally couple the drive spindle 130 and the input cam 320. It is also contemplated that block 516 may involve engaging the input cam 320 with the drive spindle 130 in another manner (e.g. via one or more gears) to correlate rotation of the drive spindle 130 with rotation of the input cam 320.

The installation procedure 510 may include block 518, which generally involves installing the trim assembly to the non-egress side of the door. For example, block 518 may involve installing the trim assembly 100 to the non-egress side 81 of the door 80 with the drive spindle 130 engaged with the input cam 320.

The process 500 may include a rotation converting procedure 520, which generally involves converting bi-directional rotation of the drive spindle from the drive spindle home position to unidirectional rotation of the actuator in an actuator actuating direction from an actuator home position to an actuator actuated position.

The rotation converting procedure 520 includes block 522, which generally involves converting rotation of the drive spindle in a first drive spindle direction from the drive spindle home position to rotation of the actuator in the actuator actuating direction from an actuator home position to an actuator actuated position. For example, block 522 may involve converting rotation of the drive spindle 130 in the first drive spindle direction (counter-clockwise in FIG. 2) to rotation of the actuator 252 in the actuator actuating direction A252 (clockwise in FIG. 8).

In the illustrated form, block 522 involves rotating the input cam 320 in the input cam first rotational direction R320 in response to rotation of the drive spindle 130 in the drive spindle first rotational direction. Block 522 may include moving the shuttle 330 in the shuttle actuating direction A330 in response to rotation of the input member 320 in the input member first rotational direction R320, for example as a result of engagement of the first engagement portion 325 with the first cam surface 335. Block 522 may further include rotating the output member 340 in the output member actuating direction A340 in response to movement of the shuttle 330 in the shuttle actuating direction A330, for example as a result of the operation of the rack-and-pinion mechanism 307. Block 522 may further include rotating the actuator 252 in the actuator actuating direction A252 in response to rotation of the output member 340 in the output member actuating direction A340.

The rotation converting procedure 520 may further includes block 524, which generally involves converting rotation of the drive spindle in a second drive spindle direction from the drive spindle home position to rotation of the actuator in the actuator actuating direction from an actuator home position to an actuator actuated position, wherein the second drive spindle direction is opposite the first drive spindle direction. For example, block 524 may involve converting rotation of the drive spindle 130 in the second drive spindle direction (clockwise in FIG. 2) to rotation of the actuator 252 in the actuator actuating direction A252 (clockwise in FIG. 8).

In the illustrated form, block 524 involves rotating the input cam 320 in the input cam second rotational direction R320' in response to rotation of the drive spindle 130 in the drive spindle second rotational direction. Block 524 may include moving the shuttle 330 in the shuttle actuating direction A330 in response to rotation of the input member 320 in the input member second rotational direction R320', for example as a result of engagement of the second engagement portion 326 with the second cam surface 336. The illustrated form of block 524 further involves rotating the output member 340 in the output member actuating direction A340 in response to movement of the shuttle 330 in the shuttle actuating direction A330, for example as a result of the operation of the rack-and-pinion mechanism 307. Block 524 may further include rotating the actuator 252 in the actuator actuating direction A252 in response to rotation of the output member 340 in the output member actuating direction A340.

In certain embodiments, the process 500 may include the actuating procedure 530, which generally involves actuating a latch mechanism in response to rotation of the actuator in the actuator actuating direction. As described herein, in the illustrated form, the actuating procedure 530 generally involves actuating the latch control assembly 230 in response to rotation of the actuator 252 from the actuator home position to the actuator actuated position in the actuator actuating direction, and actuating the latch mechanism 240 in response to actuation of the latch control assembly 230.

The actuating procedure 530 may include block 532, which generally involves shifting a slide plate in a slide plate actuating direction in response to rotation of the actuator in the actuator actuating direction. In the illustrated form, block 532 generally involves shifting the slide plate 235 in a downward direction as the projection 254 engages the protrusion 257.

The actuating procedure 530 may include block 534, which generally involves actuating the latch control assembly in response to movement of the slide plate in the slide plate actuating direction. In the illustrated form, block 534 involves actuating the latch control assembly 230 in response to downward movement of the slide plate 256 as described above.

The actuating procedure 530 may further include block 536, which generally involves actuating a latch mechanism in response to actuation of the latch control assembly. In the illustrated form, block 536 involve actuating the latch mechanism 240 in response to actuation of the latch control assembly 230, thereby retracting the latchbolt 242. It is also contemplated that block 536 may involve actuating another form of latch mechanism, such as a latch mechanism remote from the pushbar assembly 200 (e.g., a latch mechanism installed near the top of the door 80 and/or a latch mechanism installed near the bottom of the door 80).

In certain embodiments, the process 500 may include a deactuating procedure 540, which generally involves returning the exit device assembly to a deactuated state. In the illustrated form, the deactuating procedure 540 is performed in response to the drive spindle 130 returning to its home position, for example upon release of the handle 120.

The deactuating procedure 540 may include block 541, which generally involves returning the input member to the input member home position in response to return of the drive spindle to the drive spindle home position. For example, block 541 may involve causing the input cam 320 to return to the home position illustrated in FIG. 12 as the drive spindle 130 returns to the drive spindle home position (e.g., under a biasing force exerted by the trim assembly 100).

The deactuating procedure 540 may include block 542, which generally involves returning the shuttle to the shuttle home position in response to return of the input member to the input member home position. For example, block 542 may involve the biasing mechanism 350 driving the shuttle 330 in a shuttle deactuating direction opposite the shuttle actuating direction A330 as the input cam 320 returns to the input cam home position.

The deactuating procedure 540 may include block 543, which generally involves returning the output member to the output member home position in response to return of the shuttle to the shuttle home position. For example, block 543 may involve the rack-and-pinion mechanism 307 driving the output member 340 to the output member home position as the shuttle 330 returns to the shuttle home position.

The deactuating procedure 540 may include block 544, which generally involves returning the actuator to the actuator home position in response to return of the output member to the output member home position. For example, block 544 may involve the tailpiece 345 rotating the actuator 252 in the actuator deactuating direction (counter-clockwise in FIG. 8) from the actuator actuated position to the actuator home position as the output member 340 returns to the output member home position.

The deactuating procedure 540 may include block 545, which generally involves deactuating the latch control assembly in response to return of the actuator to the actuator home position. For example, block 545 may involve shifting the slide plate 256 in a slide plate deactuating direction (upward in FIG. 8) as the actuator 252 rotates in the actuator deactuating direction from the actuator actuated position to the actuator home position, thereby deactuating the latch control assembly.

The deactuating procedure 540 may include block 546, which generally involves deactuating the latch mechanism in response to deactuation of the latch control assembly. For example, block 546 may involve extending the latchbolt 242 as the latch control assembly 230 deactuates, thereby deactuating the latch mechanism 240. It is also contemplated that block 546 may involve deactuating an additional or alternative form of a latchbolt mechanism, such as one remote from the pushbar assembly 200.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:

positioning a rotation converter at a location within a door having a first side and a second side, the rotation converter comprising an output member, an input member, and a shuttle engaged between the output member and the input member, wherein the shuttle is configured to rotate the output member in a first rotational direction in response to each one of (a) rotation of the input member in the first rotational direction, and (b) rotation of the input member in a second rotational direction opposite the first rotational direction;

wherein, with the rotation converter positioned at the location within the door, the shuttle is positioned between the first side of the door and the second side of the door, and at least a portion of the input member is positioned between the first side of the door and the second side of the door.

2. The method of claim 1, further comprising engaging the output member with a latch mechanism such that the output member actuates the latch mechanism when rotated in the first rotational direction.

3. The method of claim 1, further comprising engaging the output member with a latch control assembly of a pushbar assembly such that the output member actuates the latch control assembly when rotated in the first rotational direction.

4. The method of claim 1, further comprising engaging the input member with a trim such that the trim is operable to rotate the input member in at least one of the first rotational direction or the second rotational direction.

5. The method of claim 1, further comprising:

engaging the input member with a trim comprising a handle that is biased toward a selected home position; and transitioning the trim between a first handing configuration, in which the selected home position is a first home position, and a second handing configuration, in which the selected home position is a second home position different from the first home position.

6. The method of claim 1, wherein the location within the door is defined by a door preparation.

7. The method of claim 1, further comprising converting the rotation converter from a first configuration to a second configuration, the converting comprising:

moving the output member away from the shuttle to thereby disengage a toothed region of the output member from a first rack of the shuttle;

rotating the output member about the rotational axis to thereby align the toothed region with a second rack of the shuttle; and moving the output member toward the shuttle to thereby engage the toothed region with the second rack.

8. A rotation converter, comprising:

a housing comprising a first bearing aperture and a second bearing aperture aligned with the first bearing aperture along a rotational axis;

an input member rotatably supported by the first bearing aperture for rotation about the rotational axis;

an output member rotatably supported by the second bearing aperture for rotation about the rotational axis, the output member comprising a toothed region; and a shuttle engaged between the input member and the output member, the shuttle comprising a first rack and a second rack; the shuttle configured to rotate the output member in an output member actuating direction in response to each one of (a) rotation of the input member in a first rotational direction and (b) rotation of the input member in a second rotational direction opposite the first rotational direction;

wherein the rotation converter has a first configuration in which the toothed region is engaged with the first rack and the output member actuating direction is the first rotational direction; and wherein the rotation converter has a second configuration in which the toothed region is engaged with the second rack and the output member actuating direction is the second rotational direction.

9. The rotation converter of claim 8, wherein the rotation converter is configured for mounting within a standard door preparation.

10. The rotation converter of claim 8, wherein the housing is circular about the rotational axis.

11. A system comprising the rotation converter of claim 8, further comprising:

a trim engaged with the input member and operable to rotate the input member in at least one of the first rotational direction or the second rotational direction; and a pushbar assembly engaged with the output member and configured to retract a latchbolt in response to rotation of the output member in the first rotational direction.

12. The system of claim 11, wherein the trim is mounted to a first side of a door, wherein the pushbar assembly is mounted to a second side of the door opposite the first side of the door; and wherein the rotation converter is mounted within the door and between the first side and the second side.

13. The system of claim 12, wherein at least a portion of the input member is positioned between the first side of the door and the second side of the door.

14. The rotation converter of claim 8, wherein the rotation converter is operable to transition between the first configuration and the second configuration by moving the output member along the rotational axis in a first direction to thereby disengage the toothed region from the shuttle, rotating the output member about the rotational axis, and thereafter moving the output member along the rotational axis in a second direction opposite the first direction to thereby re-engage the toothed region with the shuttle.

15. A system, comprising:

a pushbar assembly comprising a first rear surface configured to abut a first side of a door;

a trim assembly comprising a second rear surface that faces the first rear surface and is configured to abut a second side of the door opposite the first side of the door; and a rotation converter removably engaged with each of the pushbar assembly and the trim, wherein the rotation converter comprises an input member and a shuttle configured to rotate an output member in an output member actuating direction in response to each one of (a) rotation of the input member in a first rotational direction and (b) rotation of the input member in a second rotational direction opposite the first rotational direction;

wherein the shuttle is positioned between the first rear surface and the second rear surface; and wherein the input member is positioned at least partially between the first rear surface and the second rear surface.

16. The system of claim 15, wherein the rotation converter further comprises the output member.

17. The system of claim 16, wherein the output member is positioned at least partially between the first rear surface and the second rear surface.

18. The system of claim 15, further comprising the door, wherein the first rear surface abuts the first side of the door, and wherein the second rear surface abuts the second side of the door.

19. The system of claim 18, wherein the door comprises a door preparation, and wherein the rotation converter is positioned at least primarily in the door preparation.

20. The system of claim 15, wherein the output member comprises a geared portion;

wherein the shuttle comprises a first rack and a second rack;

wherein the rotation converter has a first configuration in which the toothed region is engaged with the first rack and the output member actuating direction is the first rotational direction; and wherein the rotation converter has a second configuration in which the toothed region is engaged with the second rack and the output member actuating direction is the second rotational direction.

* * * * *